US010018158B2

(12) United States Patent
Dudar

(10) Patent No.: US 10,018,158 B2
(45) Date of Patent: Jul. 10, 2018

(54) EVAPORATIVE EMISSIONS TESTING BASED ON AMBIENT LIGHT AMOUNT

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 126 days.

(21) Appl. No.: 15/178,860

(22) Filed: Jun. 10, 2016

(65) Prior Publication Data

US 2017/0356393 A1 Dec. 14, 2017

(51) Int. Cl.
*G01M 15/04* (2006.01)
*F02M 25/08* (2006.01)

(52) U.S. Cl.
CPC ................................ *F02M 25/0809* (2013.01)

(58) Field of Classification Search
USPC ........................................................ 73/114.39
See application file for complete search history.

(56) References Cited

U.S. PATENT DOCUMENTS 6,024,137 A * 2/2000 Strnad .................. B67D 7/0401 141/1
6,232,926 B1 * 5/2001 Nguyen ............... H01Q 1/1285 343/704
6,308,559 B1 * 10/2001 Davison ............. F02M 25/0809 73/114.39
6,314,797 B1 11/2001 Dawson et al.
6,336,446 B1 * 1/2002 Isobe ................. F02M 25/0809 123/198 D
6,338,369 B1 * 1/2002 Shermer .............. B67D 7/0478 141/59
6,396,040 B1 5/2002 Hill
7,109,855 B2 9/2006 Appt et al.
8,849,503 B1 9/2014 Dudar
9,309,811 B2 * 4/2016 Swann ....................... F02C 9/28
2005/0217645 A1 * 10/2005 Fukaya .............. F02M 25/0854 123/519
2011/0181233 A1 7/2011 Mino et al.
2014/0345575 A1 11/2014 Peters et al.
2015/0046026 A1 2/2015 Pearce et al.
(Continued)

FOREIGN PATENT DOCUMENTS

WO 2006029537 A1 3/2006

*Primary Examiner* — Eric S McCall
(74) *Attorney, Agent, or Firm* — Julia Voutyras; McCoy Russell LLP

(57) ABSTRACT

Methods and systems are provided for conducting a test for undesired evaporative emissions in a vehicle fuel system and evaporative emissions control system based on diurnal temperature fluctuations. In one example, a method includes maintaining a vehicle controller in a sleep mode, where a sunrise or sunset event as sensed by a solar cell configured on an external surface of the vehicle triggers the controller to an awake mode whereupon the test for undesired evaporative emissions is conducted. In this way, in use monitoring performance completion rates may be improved, undesired evaporative emissions may be reduced, and the test for undesired evaporative emissions may be conducted during both heat gains and heat losses during a diurnal cycle without negatively impacting the main battery supply.

19 Claims, 8 Drawing Sheets

(56) References Cited

U.S. PATENT DOCUMENTS

| | | | | |
|---|---|---|---|---|
| 2016/0025588 | A1 | 1/2016 | Dudar | |
| 2016/0025589 | A1 | 1/2016 | Tseng et al. | |
| 2016/0084755 | A1* | 3/2016 | Tripathi ............. | G01N 21/3504<br>73/49.7 |

* cited by examiner

EVAPORATIVE EMISSIONS TESTING BASED ON AMBIENT LIGHT AMOUNT

FIELD

The present description relates generally to methods and systems for monitoring a vehicle fuel system and evaporative emissions control system for the presence of undesired evaporative emissions.

BACKGROUND/SUMMARY

Vehicle evaporative emission control systems may be configured to store fuel vapors from fuel tank refueling and diurnal engine operations, and then purge the stored vapors during a subsequent engine operation. In an effort to meet stringent federal emissions regulations, emission control systems may need to be intermittently diagnosed for the presence of undesired evaporative emissions that could release fuel vapors to the atmosphere.

Undesired evaporative emissions may be identified using engine-off natural vacuum (EONV) during conditions when a vehicle engine is not operating. In particular, a fuel system and evaporative emissions control system may be isolated at an engine-off event. The pressure in such a fuel system and evaporative emissions control system will increase if the tank is heated further (e.g., from hot exhaust or a hot parking surface) as liquid fuel vaporizes. If the pressure rise meets or exceeds a predetermined threshold, it may be indicated that the fuel system and the evaporative emissions control system are free from undesired evaporative emissions. Alternatively, if during the pressure rise portion of the test the pressure curve reaches a zero-slope prior to reaching the threshold, as fuel in the fuel tank cools, a vacuum is generated in the fuel system and evaporative emissions system as fuel vapors condense to liquid fuel. Vacuum generation is monitored and undesired emissions identified based on expected vacuum development or expected rates of vacuum development. The EONV test may be monitored for a period of time based on available battery charge.

However, the EONV test is prone to false failures based on customer driving and parking habits. For example, a refueling event that fills the fuel tank with relatively cool liquid fuel followed by a short ensuing trip may fail to heat the fuel bulk mass and may result in a false fail if an EONV test is run. Further, the rates of pressure build and vacuum development are based in part on the ambient temperature. During mild weather conditions, the ambient temperature may restrict the amount of heating or cooling of the fuel tank following engine shut-off, and thus limit the rate of pressure or vacuum development. As such, in a case wherein a pressure build does not reach the expected threshold, the subsequent vacuum build may additionally not reach expected threshold level in the time allotted for the EONV test based on available battery charge. This may result in a false-fail condition, leading to potentially unnecessary engine service. The inventors herein have recognized these disadvantages.

U.S. Pat. No. 6,314,797 teaches sealing an evaporative emissions control system at a key-off event and monitoring a vacuum switch coupled to the evaporative emissions control system for a closing event due to a natural vacuum created in the evaporative emissions control system as it cools. If a closing event is not detected, it is determined whether a timer has exceeded a predetermined threshold value, and is so, the presence of undesired evaporative emissions are indicated. In one example, it is taught that diurnal temperature cycling may result in the formation of a vacuum-build in the sealed fuel system and evaporative emissions control system, and if the vacuum switch is closed under such conditions, then it may be indicated that the fuel system and evaporative emissions control system are free from undesired evaporative emissions. However, the inventors herein have recognized potential issues with such systems. As one example, a vehicle which is primarily driven at night, and which is thus primarily parked during the day, may only experience heat gains during times when the vehicle is in a prolonged key-off condition, and thus the vacuum switch may never close. In such an example of vehicle operation, in-use monitoring performance (JUMP) rates may be significantly impacted. Furthermore, the use of a vacuum switch may require an application specific integrated circuit (ASIC) chip to be alive at all times in a low power mode in order to sense that the vacuum switch is closed from a diurnal cycle cooldown. The use of such a chip can affect the main battery drain. Ideally, a controller would only be woken up at an opportune time for conducting an evaporative emissions test diagnostic procedure, where an opportune time may comprise portions of the diurnal cycle where heat gains and losses are greatest.

Thus, the inventors herein have developed systems and methods to at least partially address the above issues. In one example, a method is provided comprising routing fuel vapors from a fuel tank in a fuel system to an evaporative emissions control system, the fuel system supplying fuel to an engine which propels a vehicle; conducting an evaporative emissions test diagnostic procedure of the fuel system and the evaporative emissions control system; and adjusting timing of the evaporative emissions test diagnostic procedure responsive to detection of an ambient light amount.

As one example, the evaporative emissions test diagnostic procedure occurs during a vehicle-off condition, and includes maintaining a controller of the vehicle in a sleep mode during the vehicle-off condition, waking the controller based on the ambient light amount, and returning the controller to sleep mode responsive to completion of the evaporative emissions test diagnostic procedure. In one example, the ambient light amount may be based on output from a solar cell configured on an external surface of the vehicle. As such, the ambient light amount may be related to an ambient temperature increase or an ambient temperature decrease during the course of a diurnal temperature cycle, wherein the ambient light amount includes a change in ambient light greater than a threshold that results in initiation of the evaporative emissions test diagnostic procedure. In this way, the evaporative emissions test diagnostic procedure may be conducted during either a transition from dark-to-sunlight hours (sunrise), or from sunlight-to-dark (sunset) hours. Enabling the evaporative emissions test diagnostic procedure to execute at either sunrise or sunset is an advantage over other prior art methods which make use of a vacuum switch to detect undesired evaporative emissions based on the diurnal temperature cycle. By enabling the evaporative emissions test diagnostic to execute at either sunrise or sunset events, both a pressure increase and a vacuum build may be utilized to infer the presence or absence of undesired evaporative emissions, in contrast to only relying on a vacuum build. As such, in use monitoring performance completion rates may be improved. Furthermore, by sleeping the controller during vehicle-off conditions, and only waking the controller responsive to a change in ambient light amount greater than a threshold, main battery drain may be reduced.

In another example, a method is provided, comprising routing fuel vapors from a fuel tank in a vehicle fuel system to an evaporative emissions control system which is coupled to atmosphere, the fuel tank supplying fuel to an engine which propels a vehicle and responsive to an indication of a vehicle-off event: in a first condition, maintaining a controller of the vehicle awake and conducting an engine off natural vacuum (EONV) test of the fuel system and the evaporative emissions control system; and in a second condition, sleeping the controller and searching for an indicated change in ambient light amount greater than a threshold, waking the sleeping controller when the indicated change in ambient light amount is greater than a threshold, and conducting an evaporative emissions test diagnostic procedure of the fuel system and the evaporative emissions control system in response to the waking of the controller.

As one example the method includes determining a heat rejection index, wherein the heat rejection index is based on an amount and/or timing of heat rejected by the engine for an engine run time duration prior to the vehicle-off event; wherein the first condition comprises the heat rejection index above a threshold; and wherein the second condition comprises the heat rejection index below the threshold. In this way, by determining at the vehicle-off condition whether to conduct an EONV test or whether to conduct an evaporative emissions test diagnostic procedure based on a change in ambient light amount, in use monitoring performance (IUMP) rates for checking the fuel system and evaporative emissions control system for the presence of undesired evaporative emissions may be increased without affecting main battery drain.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
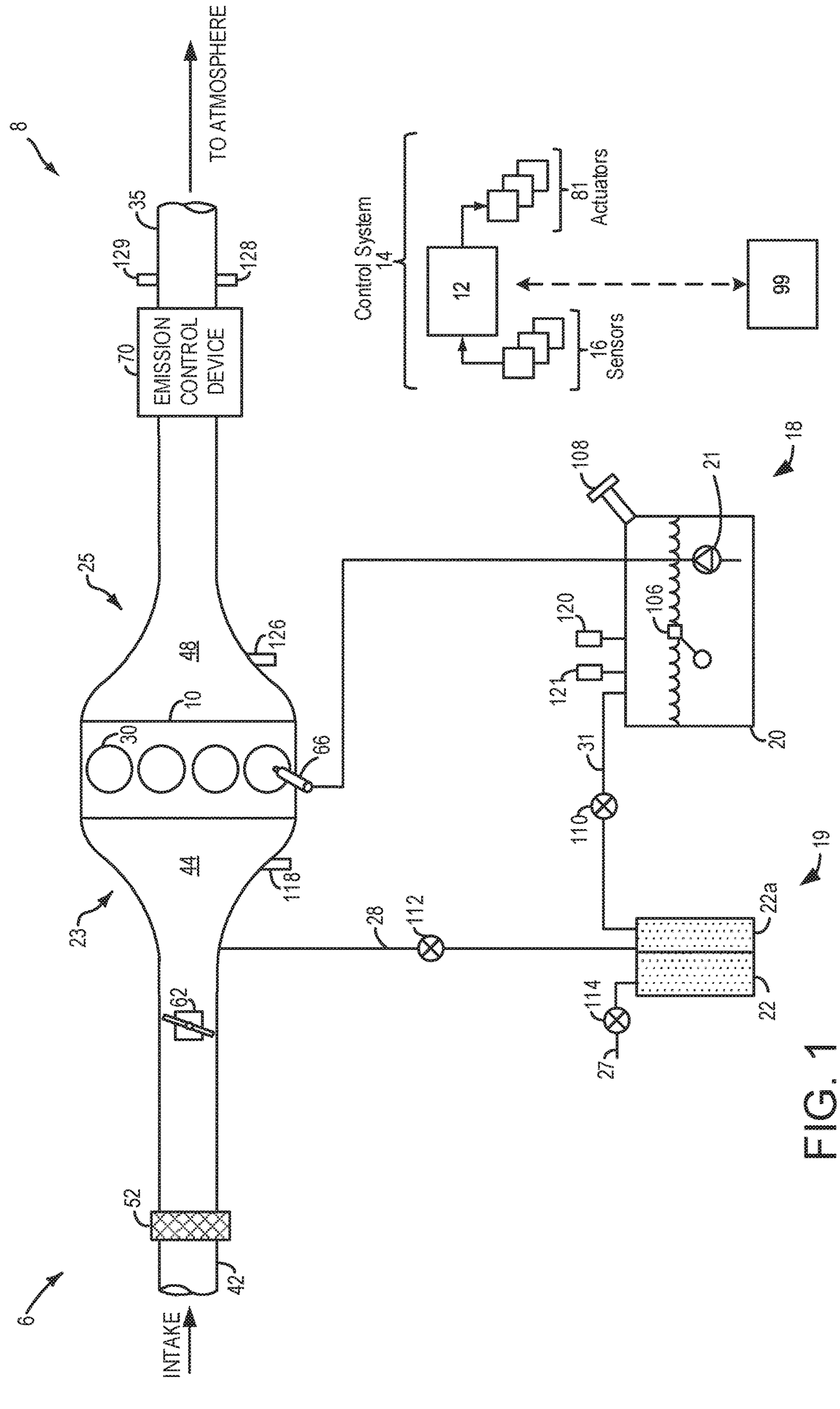
FIG. 1 shows a schematic depiction of a fuel system and an evaporative emissions control system coupled to an engine system.

This detailed description relates to systems and methods for conducting an evaporative emissions test diagnostic procedure during vehicle-off conditions. Specifically, responsive to a vehicle-off event, it may be determined whether heat rejected from the engine during a previous drive cycle is sufficient to conduct an engine-off natural vacuum test, or if the heat rejected from the engine is not sufficient and thus a test diagnostic may be conducted based on a change in ambient light amount. The systems and methods may be applied to a vehicle system with an evaporative emissions control system coupled to a fuel system and to an engine system, as depicted in FIG. 1. A test diagnostic may be conducted based on an ambient light amount due to the fact that near sunrise and sunset events, heat gains or losses are at their greatest, as illustrated by the schematic depiction of a diurnal temperature cycle in FIG. 2. As such, if a vehicle fuel system and evaporative emissions control system are sealed at times where heat gains or losses are at their greatest, a pressure build or a vacuum build, respectively, may be utilized to indicate the presence or absence of undesired evaporative emissions stemming from the fuel system and/or evaporative emissions control system. Such a change in ambient light amount may be detected by a solar cell mounted on a vehicle, such as the vehicle system illustrated in FIG. 3A. In order to detect a change in ambient light amount such as that of a sunrise or sunset event, an edge detector such as the edge detector illustrated in FIG. 3B with an exclusive (XOR) logic gate, may be utilized. Such an edge detector may be capable of sensing rising or falling edges corresponding to a sunrise or sunset event, respectively, where FIG. 3C illustrates the functionality of the edge detector depicted in FIG. 3B. Such an edge detector may be coupled to output from a solar cell, as illustrated by the circuit depicted in FIG. 4A, where responsive to an indication of a rising or falling edge (sunrise or sunset event), a vehicle controller may be woken up from a sleep condition. A wake-up event of the controller during vehicle-off conditions may thus trigger the controller to command closed a canister vent valve (CVV), illustrated in FIG. 4B, where closing the CVV seals the vehicle fuel system and evaporative emissions control system from atmosphere. Responsive to an indication of a vehicle-off event, it may thus be determined whether an amount of heat rejected from the engine during a previous drive cycle is sufficient to conduct an engine-off natural vacuum (EONV) test diagnostic procedure to test for the presence or absence of undesired evaporative emissions. As depicted in the example method illustrated in FIG. 5, responsive to an indication that an amount of heat rejected from the engine is sufficient for an EONV test, an EONV test may be conducted by the example method illustrated in FIG. 6. However, if it is indicated at an engine-off event that an amount of heat rejection from the engine during a previous drive cycle is not sufficient for conducting an EONV test, an evaporative emissions test diagnostic procedure may be conducted based on an ambient light amount, according to the method depicted in FIG. 7. An example timeline for determining whether to conduct an EONV test or an evaporative emissions test based on an ambient light amount, where it is indicated that an amount of heat rejection from the engine is not sufficient for conducting the EONV test and thus a test is conducted based on ambient light amount, is illustrated in FIG. 8.

FIG. 1 shows a schematic depiction of a hybrid vehicle system 6 that can derive propulsion power from engine system 8 and/or an on-board energy storage device, such as a battery system (not shown). An energy conversion device, such as a generator (not shown), may be operated to absorb energy from vehicle motion and/or engine operation, and then convert the absorbed energy to an energy form suitable for storage by the energy storage device.

Engine system 8 may include an engine 10 having a plurality of cylinders 30. Engine 10 includes an engine intake 23 and an engine exhaust 25. Engine intake 23 includes an air intake throttle 62 fluidly coupled to the engine intake manifold 44 via an intake passage 42. Air may enter intake passage 42 via air filter 52. Engine exhaust 25 includes an exhaust manifold 48 leading to an exhaust passage 35 that routes exhaust gas to the atmosphere. Engine exhaust 25 may include one or more emission control devices 70 mounted in a close-coupled position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 8 is a boosted engine system, the engine system may further include a boosting device, such as a turbocharger (not shown).

Engine system 8 is coupled to a fuel system 18, and evaporative emissions system 19. Fuel system 18 includes a fuel tank 20 coupled to a fuel pump 21, the fuel tank supplying fuel to an engine 10 which propels a vehicle. Evaporative emissions system 19 includes fuel vapor canister 22. During a fuel tank refueling event, fuel may be pumped into the vehicle from an external source through refueling port 108. Fuel tank 20 may hold a plurality of fuel blends, including fuel with a range of alcohol concentrations, such as various gasoline-ethanol blends, including E10, E85, gasoline, etc., and combinations thereof. A fuel level sensor 106 located in fuel tank 20 may provide an indication of the fuel level (“Fuel Level Input”) to controller 12. As depicted, fuel level sensor 106 may comprise a float connected to a variable resistor. Alternatively, other types of fuel level sensors may be used.

Fuel pump 21 is configured to pressurize fuel delivered to the injectors of engine 10, such as example injector 66. While only a single injector 66 is shown, additional injectors are provided for each cylinder. It will be appreciated that fuel system 18 may be a return-less fuel system, a return fuel system, or various other types of fuel system. Vapors generated in fuel tank 20 may be routed to fuel vapor canister 22, via conduit 31, before being purged to the engine intake 23.

Fuel vapor canister 22 is filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor canister 22 may be purged to engine intake 23 by opening canister purge valve 112. While a single canister 22 is shown, it will be appreciated that fuel system 18 may include any number of canisters. In one example, canister purge valve 112 may be a solenoid valve wherein opening or closing of the valve is performed via actuation of a canister purge solenoid.

Canister 22 may include a buffer **22*a* (or buffer region), each of the canister and the buffer comprising the adsorbent. As shown, the volume of buffer 22*a* may be smaller than (e.g., a fraction of) the volume of canister 22. The adsorbent in the buffer 22*a* may be same as, or different from, the adsorbent in the canister (e.g., both may include charcoal). Buffer 22*a* may be positioned within canister 22** such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine.

Canister 22 includes a vent 27 for routing gases out of the canister 22 to the atmosphere when storing, or trapping, fuel vapors from fuel tank 20. Vent 27 may also allow fresh air to be drawn into fuel vapor canister 22 when purging stored fuel vapors to engine intake 23 via purge line 28 and purge valve 112. While this example shows vent 27 communicating with fresh, unheated air, various modifications may also be used. Vent 27 may include a canister vent valve (CVV) 114 to adjust a flow of air and vapors between canister 22 and the atmosphere. The canister vent valve may also be used for diagnostic routines. When included, the vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister. In one example, canister vent valve 114 may be a solenoid valve wherein opening or closing of the valve is performed via actuation of a canister vent solenoid. In particular, the canister vent valve may be in an open position that is closed upon actuation of the canister vent solenoid.

As such, hybrid vehicle system 6 may have reduced engine operation times due to the vehicle being powered by engine system 8 during some conditions, and by the energy storage device under other conditions. While the reduced engine operation times reduce overall carbon emissions from the vehicle, they may also lead to insufficient purging of fuel vapors from the vehicle’s emission control system. To address this, a fuel tank isolation valve 110 may be optionally included in conduit 31 such that fuel tank 20 is coupled to canister 22 via the valve. During regular engine operation, isolation valve 110 may be kept closed to limit the amount of diurnal or “running loss” vapors directed to canister 22 from fuel tank 20. During refueling operations, and selected purging conditions, isolation valve 110 may be temporarily opened, e.g., for a duration, to direct fuel vapors from the fuel tank 20 to canister 22. By opening the valve during purging conditions when the fuel tank pressure is higher than a threshold (e.g., above a mechanical pressure limit of the fuel tank), the refueling vapors may be released into the canister and the fuel tank pressure may be maintained below pressure limits. While the depicted example shows isolation valve 110 positioned along conduit 31, in alternate embodiments, the isolation valve may be mounted on fuel tank 20.

One or more pressure sensors 120 may be coupled to fuel system 18 for providing an estimate of a fuel system (and evaporative emissions system) pressure. In one example, the fuel system pressure, and in some example evaporative emissions system pressure as well, is indicated by pressure sensor 120, where pressure sensor 120 is a fuel tank pressure transducer (FTPT) coupled to fuel tank 20. While the depicted example shows pressure sensor 120 directly coupled to fuel tank 20, in alternate embodiments, the pressure sensor may be coupled between the fuel tank and canister 22, specifically between the fuel tank and isolation valve 110. In still other embodiments, a first pressure sensor may be positioned upstream of the isolation valve (between the isolation valve and the canister) while a second pressure sensor is positioned downstream of the isolation valve (between the isolation valve and the fuel tank), to provide an estimate of a pressure difference across the valve. In some examples, a vehicle control system may infer and indicate undesired evaporative emissions based on changes in a fuel tank (and evaporative emissions system) pressure during an evaporative emissions diagnostic routine.

One or more temperature sensors 121 may also be coupled to fuel system 18 for providing an estimate of a fuel system temperature. In one example, the fuel system temperature is a fuel tank temperature, wherein temperature sensor 121 is a fuel tank temperature sensor coupled to fuel tank 20 for estimating a fuel tank temperature. While the depicted example shows temperature sensor 121 directly coupled to fuel tank 20, in alternate embodiments, the temperature sensor may be coupled between the fuel tank and canister 22.

Fuel vapors released from canister 22, for example during a purging operation, may be directed into engine intake manifold 44 via purge line 28. The flow of vapors along purge line 28 may be regulated by canister purge valve (CPV) 112, coupled between the fuel vapor canister and the engine intake. The quantity and rate of vapors released by the canister purge valve may be determined by the duty cycle of an associated canister purge valve solenoid (not shown). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc. By commanding the canister purge valve to be closed, the controller may seal the fuel vapor recovery system from the engine intake. An optional canister check valve (not shown) may be included in purge line 28 to prevent intake manifold pressure from flowing gases in the opposite direction of the purge flow. As such, the check valve may be necessary if the canister purge valve control is not accurately timed or the canister purge valve itself can be forced open by a high intake manifold pressure. An estimate of the manifold absolute pressure (MAP) or manifold vacuum (ManVac) may be obtained from MAP sensor 118 coupled to intake manifold 44, and communicated with controller 12. Alternatively, MAP may be inferred from alternate engine operating conditions, such as mass air flow (MAF), as measured by a MAF sensor (not shown) coupled to the intake manifold.

Fuel system 18 and evaporative emissions system 19 may be operated by controller 12 in a plurality of modes by selective adjustment of the various valves and solenoids. For example, the fuel system and evaporative emissions system may be operated in a fuel vapor storage mode (e.g., during a fuel tank refueling operation and with the engine not running), wherein the controller 12 may open isolation valve 110 and canister vent valve 114 while closing canister purge valve (CPV) 112 to direct refueling vapors into canister 22 while preventing fuel vapors from being directed into the intake manifold.

As another example, the fuel system and evaporative emissions system may be operated in a refueling mode (e.g., when fuel tank refueling is requested by a vehicle operator), wherein the controller 12 may open isolation valve 110 and canister vent valve 114, while maintaining canister purge valve 112 closed, to depressurize the fuel tank before enabling fuel to be added therein. As such, isolation valve 110 may be kept open during the refueling operation to allow refueling vapors to be stored in the canister. After refueling is completed, the isolation valve may be closed.

As yet another example, the fuel system and evaporative emissions system may be operated in a canister purging mode (e.g., after an emission control device light-off temperature has been attained and with the engine running), wherein the controller 12 may open canister purge valve 112 and canister vent valve while closing isolation valve 110. Herein, the vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine. The purging may be continued until the stored fuel vapor amount in the canister is below a threshold. During purging, the learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel vapor canister. For example, one or more oxygen sensors (not shown) may be coupled to the canister 22 (e.g., downstream of the canister), or positioned in the engine intake and/or engine exhaust, to provide an estimate of a canister load (that is, an amount of fuel vapors stored in the canister). Based on the canister load, and further based on engine operating conditions, such as engine speed-load conditions, a purge flow rate may be determined.

While the above descriptions depict examples where a fuel tank isolation valve is included in the vehicle system, in other examples a fuel tank isolation valve may not be included without departing from the scope of this disclosure.

Vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, MAP sensor 118, pressure sensor 120, and pressure sensor 129. Other sensors such as additional pressure, temperature, air/fuel ratio, and composition sensors may be coupled to various locations in the vehicle system 6. As another example, the actuators may include fuel injector 66, isolation valve 110, purge valve 112, vent valve 114, fuel pump 21, and throttle 62.

Control system 14 may further receive information regarding the location of the vehicle from an on-board global positioning system (GPS). Information received from the GPS may include vehicle speed, vehicle altitude, vehicle position, etc. This information may be used to infer engine operating parameters, such as local barometric pressure.

Control system 14 may further be configured to receive information via the internet or other communication networks. Information received from the GPS may be cross-referenced to information available via the internet to determine local weather conditions, local vehicle regulations, etc. Control system 14 may use the internet to obtain updated software modules which may be stored in non-transitory memory. For example, control system 14 may be communicatively coupled to an off-board computing system 99 such as a network or cloud computing system via wireless communication, which may be Wi-Fi, Bluetooth, a type of cellular service, or a wireless data transfer protocol. As such, this connectivity where the vehicle data is uploaded, also referred to as the "cloud", may be a commercial server or a private server where the data is stored and then acted upon by optimization algorithms. The algorithm may process data from a single vehicle, a fleet of vehicles, a family of engines, a family of powertrains, or a combination thereof. The algorithms may further take into account the system limitations, produce calibration data for optimizing powertrain outputs, and send them back to the vehicle(s) where they are applied. Off-board computing system 99 may store or provide access to data that may be downloaded to control system 14 for processing by controller 12.

Controller 12 may be configured as a conventional microcomputer including a microprocessor unit, input/output ports, read-only memory, random access memory, keep alive memory, a controller area network (CAN) bus, etc. Controller 12 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines. An example control routine is described herein with regard to FIGS. 5-7.

Controller 12 may also be configured to intermittently perform evaporative emissions detection routines on fuel system 18 and evaporative emissions system 19 to confirm that the fuel system and/or evaporative emissions system is not degraded. As such, various diagnostic evaporative emissions detection tests may be performed while the engine is off (engine-off evaporative emissions test) or while the engine is running (engine-on evaporative emissions test). Evaporative emissions tests performed while the engine is running may include applying a negative pressure on the fuel system and evaporative emissions system for a duration (e.g., until a target vacuum is reached) and then sealing the fuel system and evaporative emissions system while monitoring a change in pressure (e.g., a rate of change in the vacuum level, or a final pressure value). Evaporative emissions tests performed while the engine is not running may include sealing the fuel system and evaporative emissions system following engine shut-off and monitoring a change in pressure. This type of evaporative emissions test is referred to herein as an engine-off natural vacuum test (EONV). In sealing the fuel system and evaporative emissions system following engine shut-off, pressure in such a fuel system and evaporative emissions control system will increase if the tank is heated further (e.g., from hot exhaust or a hot parking surface) as liquid fuel vaporizes. If the pressure rise meets or exceeds a predetermined threshold, it may be indicated that the fuel system and the evaporative emissions control system are free from undesired evaporative emissions. Alternatively, if during the pressure rise portion of the test the pressure curve reaches a zero-slope prior to reaching the threshold, as fuel in the fuel tank cools, a vacuum is generated in the fuel system and evaporative emissions system as fuel vapors condense to liquid fuel. Vacuum generation may monitored and undesired emissions identified based on expected vacuum development or expected rates of vacuum development. The EONV test may be monitored for a period of time based on available battery charge.

However, as described above and which will be described in further detail below, in some examples heat rejection from the engine during a previous drive cycle may not be sufficient for conducting an EONV test. In addition, rates of pressure build and vacuum development can be affected by ambient temperature and other weather conditions. As such, if the EONV test is run under sub-optimal conditions, then the presence of undesired evaporative emissions may be falsely indicated. In another approach, diurnal temperature changes may result in a pressure or vacuum build in a sealed fuel system and evaporative emissions control system, such that the presence or absence of undesired evaporative emissions may be indicated. As described below, an ideal time for waking a vehicle controller to seal the fuel system and evaporative emissions control system for conducting an evaporative emissions test diagnostic include sunrise and sunset events.

Figure 2:
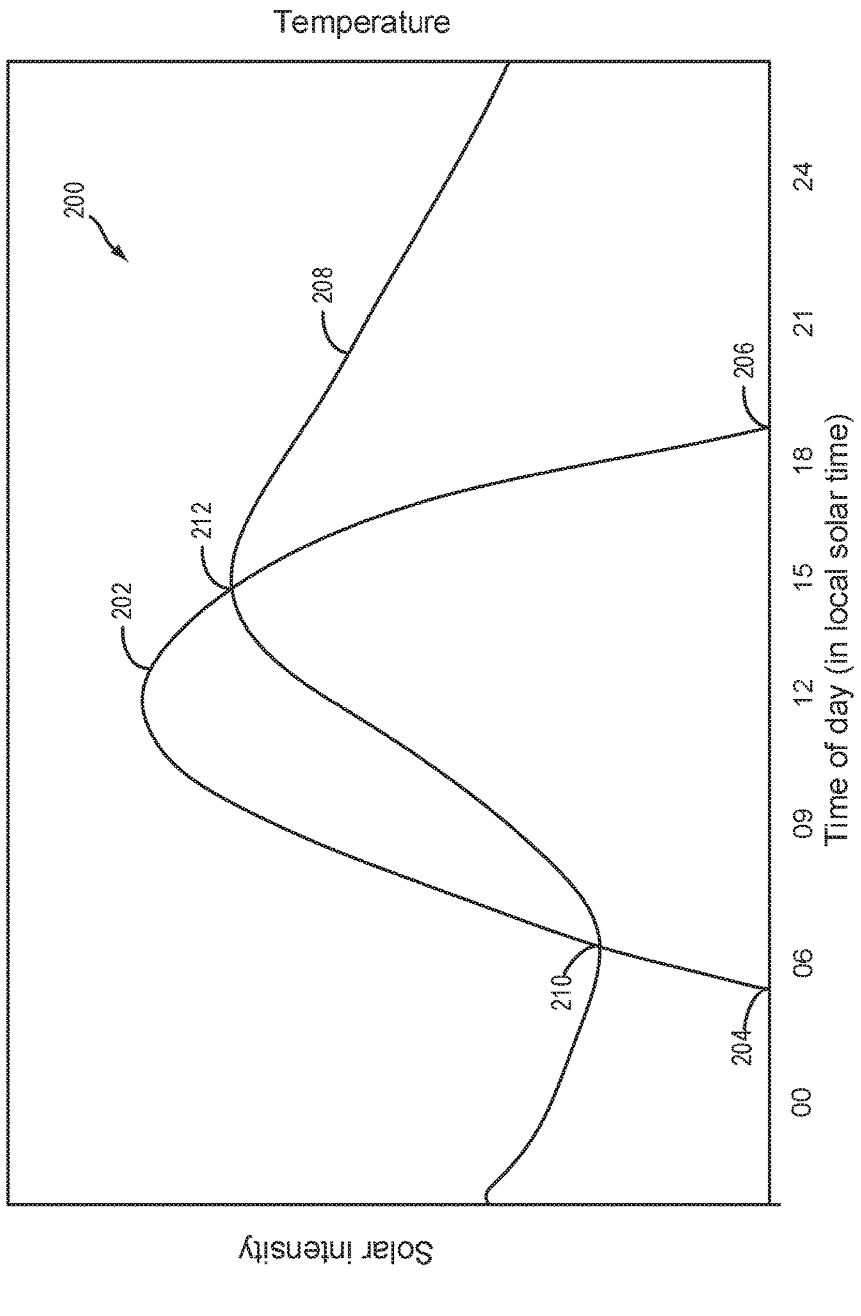
FIG. 2 shows a schematic depiction of temperature changes during a diurnal cycle.

Turning now to FIG. 2, an example illustration of a diurnal cycle 200 as a graph of solar intensity and temperature as a function of the time of day, is shown. Incoming solar radiation 202 begins increasing at sunrise 204, and rises to a maximum near mid-day before declining until sunset 206. As such, sunrise 204 marks a time of day near where a heat gain cycle is at its greatest, and sunset 206 marks a time of day near where a heat loss cycle is at its greatest. Accordingly, ambient temperature 208 is shown, illustrating the increase in temperature from a minimum temperature 210 near sunrise 204, and the decrease in temperature from a maximum temperature 212 near sunset 206. As such, both sunrise 204 and sunset 206 mark time-points during a diurnal cycle 200, where sealing a fuel system and/or an evaporative emissions system may result in the greatest increases (e.g., at sunrise) or decreases (e.g., at sunset) in pressure in the fuel system and evaporative emissions system. As will be described in further detail below, a method that is able to sense sunrise 204 and sunset 206 events thus represents an effective way to initiate evaporative emissions test diagnostics at timepoints during the day where opportunities for robust results from such a test are greatest. Furthermore, as will be discussed further below, the use of a solar cell to sense sunrise or sunset events may enable a controller to be awoken only at opportune times for conducting an evaporative emissions test diagnostic, thus eliminating a need to keep electronics alive during times where such electronics are not being utilized.

Figure 3A:
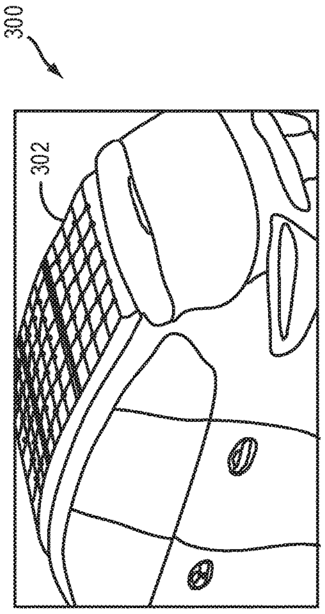
FIG. 3A shows a schematic depiction of a vehicle with a solar cell array mounted on the top of the vehicle.
Figure 3B:
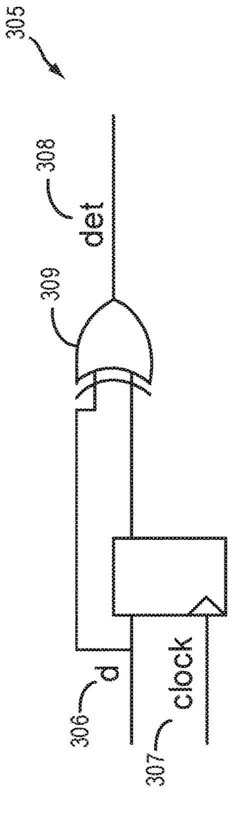
FIG. 3B shows a schematic depiction of an edge detector circuit.
Figure 3C:
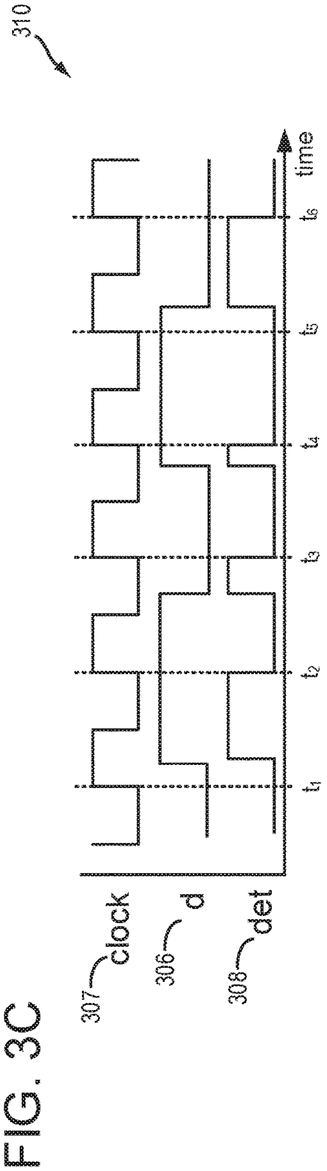
FIG. 3C shows an example timeline illustrating the functionality of an edge detector circuit.

FIG. 3A shows an example vehicle system 300, with a solar roof 302 existing on the vehicle (e.g., Ford CMAX). As such, in an example where a vehicle is equipped with a solar roof 302, the solar roof may be configured to sense sunrise or sunset events, whereupon such an indication may be utilized to conduct an evaporative emissions test diagnostic procedure. However, while a solar roof is depicted in FIG. 3A, such an example is not meant to be limiting in any way, and any solar cell capable of detecting sunrise and/or sunset events and conveying the information to a controller (e.g., 12) of a vehicle may be utilized without departing from the scope of the present disclosure.

To sense sunrise or sunset events, output voltage from a solar cell such as that depicted in FIG. 3A, may be processed by an edge detector, such as edge detector 305. Such an example edge detector 305 may include input (d) 306, where input (d) 306 comprises the output voltage from the solar cell. Such an example edge detector 305 may further include a clock input 307, where clock input 307 determines how often the input (d) 306 will be sampled. Such an example edge detector 305 may further include output (det) 308, which may pulse high when an edge is detected on the input (d) 306. Edge detector 305 may further include an exclusive OR (XOR) logic gate 309, such that edge detector 305 may detect both rising and falling edges, where a rising edge may correspond to a sunrise event, and where a falling edge may correspond to a sunset event, for example. Functionally, edge detector 305 may store the state of the signal at the last rising clock edge, and compare it to a current value of the input (d) 306. If a state change matches either a rising edge or a falling edge, the output (det) 308 may go high until the next rising clock edge. As will be described in further detail below, responsive to the output (det) 308 going high as a result of a rising or falling edge, a vehicle fuel system and/or evaporative emissions system may be sealed from atmosphere and a test for evaporative emissions may be conducted.

FIG. 3C depicts a sample set of waveforms 310 to illustrate the functionality of edge detector 305. Depicted is clock input 307, input (d) 306, and output (det) 308. As shown, rising clock edges are illustrated at time t1, t2, t3, t4, t5, and t6. Between time t1 and t2, input (d) 306 indicates a rising edge. Accordingly, output (det) 308 pulses high. However, at time t2, at the next rising clock edge, output (det) 308 is cleared. Between time t2 and t3, input (d) 306 indicates a falling edge. Accordingly, output (det) 308 again pulses high, and is cleared at time t3, corresponding to the next rising clock edge. Again, between time t3 and t4, input (d) 306 indicates a rising edge, as such, output (det) 308 pulses high, and is cleared at the next rising clock edge at time t4. Between time t4 and t5, input (d) 306 does not indicate a rising or falling edge. Accordingly, output (det) 308 does not pulse high between time t4 and t5. Between time t5 and t6, input (d) 306 indicates a falling edge. Again, output (det) 308 pulses high, and output (det) 308 is subsequently cleared at the next rising clock edge at time t6. It may be understood that FIG. 3C is shown for illustrative purposes only, to illustrate functionality of edge detector 305 illustrated in FIG. 3B. As discussed above, such an edge detector may be utilized to detect sunrise or sunset events, in order to initiate an evaporative emissions test diagnostic procedure at times where the greatest increases or decreases in pressure in a sealed fuel system and/or evaporative emissions system are likely during a diurnal cycle.

Figure 4A:
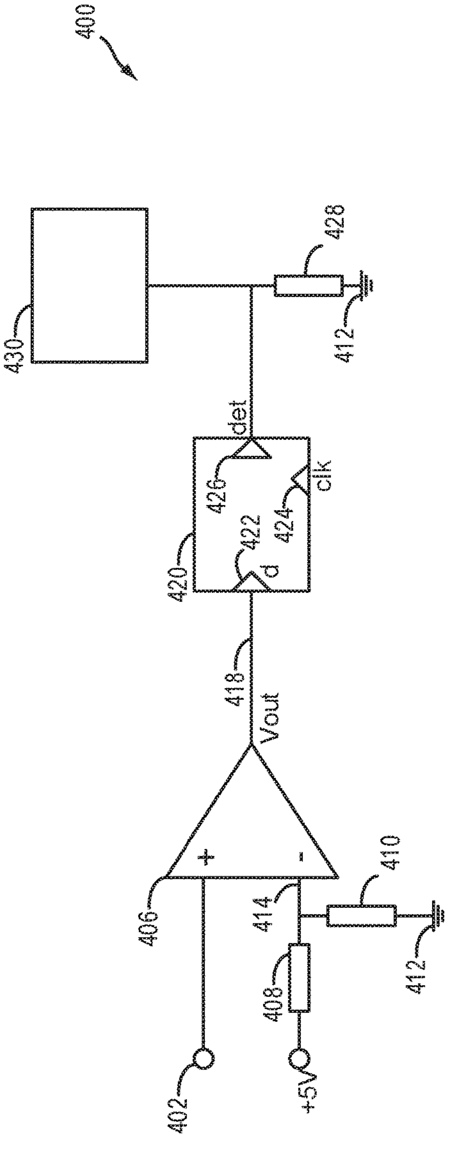
FIG. 4A shows a schematic depiction of an example circuit diagram for waking a vehicle controller based on input from a solar cell.

Turning now to FIG. 4A, an example circuit diagram is illustrated, depicting how output from a solar cell (e.g., 302) may be utilized to trigger a wake-up event at a vehicle controller (e.g., 12) during vehicle-off conditions in order to conduct an evaporative emissions test diagnostic procedure. More specifically, output from a solar cell sensor 402 may comprise non-inverting input (+) to an operational amplifier comparator circuit 406. An inverting input (−) may be supplied from a voltage source (e.g., +5V), coupled to a first resistor (R1) 408, and a second resistor (R2) 410 in series, and further coupled to ground 412. As such, a reference voltage (Vref) 414 may comprise the inverting input (−), where Vref 414 is defined by a simple voltage divider equation $$Vref=5*(R2/R1+R2). \quad (1)$$

Accordingly, Vout 418 may be approximately defined as:

$$Vout=[\text{Solar cell sensor}-Vref] \quad (2)$$

where Vout 418 may comprise input into edge detector circuit 420, where edge detector 420 may comprise an edge detector such as edge detector 305 described above with regard to FIG. 3B. More specifically, Vout 418 may comprise the input (d) 422 to edge detector 420. Edge detector 420 may include a clock input 424, which may determine the frequency at which the input (d) 422 is sampled. Edge detector output (det) 426 may be coupled to a pull-down resistor 428 coupled to ground 412, and further coupled to a wake module 430 of the vehicle controller (e.g., 12). Edge detector 420 may comprise an XOR logic gate, such as that described above with regard to FIG. 3B, such that edge detector 420 may detect both rising and falling edges, where a rising edge may correspond to a sunrise event, and where a falling edge may correspond to a sunset event, or vice versa. Responsive to edge detector output (det) 426 pulsing high in response to a sunrise or sunset event, the vehicle controller may be woken up via wake module 430, and such an awakening of the controller may trigger sealing of a vehicle fuel system and/or evaporative emissions system. For example, a canister vent valve (e.g., 114) may be commanded closed to seal the fuel system and evaporative emissions system such that an evaporative emissions test diagnostic procedure may be conducted. Clock input 424 may clear/reset the edge detector output (det) 426 responsive to a subsequent rising clock edge, as described above with regard to FIG. 3B and FIG. 3C. Once the controller is triggered to wake due to the edge detector output (det) 426 pulsing high, the controller may remain awake until the evaporative emissions test diagnostic procedure is completed, as will be described in further detail below.

Figure 4B:
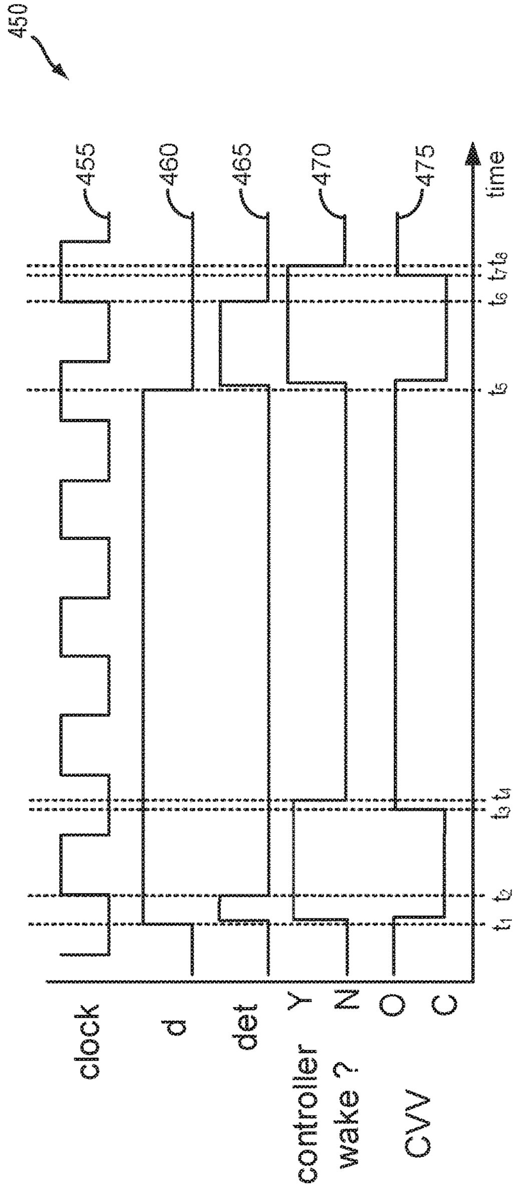
FIG. 4B shows an example timeline illustrating the functionality of the circuit depicted in FIG. 4A.

Turning now to FIG. 4B, an example timeline 450 is depicted illustrating the functionality of example circuit diagram 400 described above with regard to FIG. 4A. Timeline 450 includes plot 455, indicating a frequency at which a clock input (e.g., 424) samples input (d) to edge detector (e.g., 420), over time. Accordingly, timeline 450 further includes plot 460, indicating input (d) to edge detector, over time. Responsive to a sunrise or sunset event, input (d) may indicate a rising or falling edge, for example. In response to a rising or falling edge, edge detector output (det) (e.g., 426) may pulse high, as described above. Accordingly, timeline 450 further includes plot 465, indicating edge detector output (det), over time. Edge detector output (det) pulsing high may trigger a wake module (e.g., 430) to wake a vehicle controller. As such, timeline 450 further includes plot 470, indicating whether a vehicle controller has been woken up, over time. For example, a controller may be indicated to be not awake (N), or awake (Y). Finally, responsive to the controller being woken up due to detection of a rising or falling edge as indicated by an edge detector (e.g., 420), a fuel system and/or evaporative emissions control system may be sealed by commanding closed a canister vent valve (CVV) (e.g. 114). For example, CVV may be open (O) during vehicle-off conditions, and commanded to close (C) responsive to detection of a rising or falling edge corresponding to a sunrise or sunset event as discussed above. Furthermore, once awake, the vehicle controller (e.g., 12) may conduct an evaporative emissions test diagnostic as discussed in further detail below, and responsive to the test diagnostic being complete, the CVV may be commanded open prior to sleeping the controller. As such, timeline 450 further includes plot 475, indicating whether CVV is open or closed, over time.

It may be understood that timeline 450 comprises a vehicle-off condition. At time t1, a rising edge is detected, indicated by plot 460, where the rising edge may comprise a sunrise event, for example. As such, between time t1 and t2, edge detector output, as indicated by plot 465, pulses high. As the edge detector output pulses high, a controller of the vehicle is triggered to an awake mode, indicated by plot 470. As the controller was triggered to an awake mode, a CVV may be subsequently closed, as indicated by plot 475. By closing the CVV, a vehicle fuel system and evaporative emissions control system may be sealed from atmosphere in order to conduct an evaporative emissions test diagnostic procedure. While not explicitly illustrated, it may be understood that a vehicle canister purge valve (e.g., 112) may additionally be maintained closed, thus additionally sealing the fuel system and/or evaporative emissions control system from engine intake.

At time t2, a rising clock edge is indicated, thus edge detector output (det) is cleared/reset, as indicated by plot 465. However, the controller, having been triggered to awake mode, may remain in awake mode in order to conduct an evaporative emissions test diagnostic procedure. As such, between time t2 and t3, the evaporative emissions test procedure may be conducted. Such a procedure will be discussed in further detail below. Briefly, conducting the evaporative emissions test diagnostic may include monitoring pressure in the fuel system and evaporative emissions control system for a predetermined duration, and indicating a passing result responsive to pressure in the fuel system and evaporative emissions system reaching predetermined pressure thresholds. For example, the predetermined pressure threshold may comprise a positive pressure threshold, or a negative pressure threshold. The evaporative emissions test diagnostic procedure may comprise a predetermined duration, where, if a predetermined pressure threshold is not reached within the timeframe of the predetermined duration, then undesired emissions may be indicated and the test may be indicated to be complete, described in further detail below.

At time t3, it may be understood that the evaporative emissions test diagnostic procedure is complete. Accordingly, the CVV is commanded open, as indicated by plot 475. As the evaporative emissions test diagnostic procedure is complete at time t3 and the CVV has been commanded open, at time t4 the vehicle controller is again returned to a sleep-mode in order to conserve battery power.

Between time t4 and t5, the edge detector clock input continues to sample for rising or falling edges, however neither a rising nor a falling edge is detected during the time period comprising time t4 to t5. As such, the controller is maintained in sleep-mode, and the CVV is maintained open.

At time t5, a falling edge is detected, as indicated by plot 460. The falling edge may correspond to a sunset event, for example. Accordingly, between time t5 and t6, edge output (det) pulses high, which wakes the vehicle controller. As the vehicle controller is triggered to an awake mode as the result of a detected edge, the CVV is commanded closed in order to seal the fuel system and evaporative emissions control system such that an evaporative emissions test diagnostic procedure may be conducted. At time t6, a rising clock edge is indicated, and accordingly edge output (det) is cleared/reset, as indicated by plot 465.

At time t7, the evaporative emissions test diagnostic procedure is complete, and accordingly the CVV is commanded closed, as indicated by plot 475. As discussed above, the evaporative emissions test diagnostic may include monitoring pressure in the fuel system and/or evaporative emissions control system for a predetermined duration, and indicating an absence of undesired evaporative emissions responsive to a predetermined pressure threshold being reached, and indicating the presence of undesired evaporative emissions responsive to the predetermined duration expiring prior to a predetermined threshold being reached.

Subsequent to the CVV being commanded closed, the controller is returned to sleep mode, as indicated by plot 470, as discussed above. By triggering a vehicle controller to an awake mode responsive to indications of a sunrise or sunset event, wherein responsive to being triggered to an awake mode an evaporative emissions test diagnostic is conducted, battery power may be conserved, and the evaporative emissions test diagnostic may be conducted at times where robust results are likely.

Figure 5:
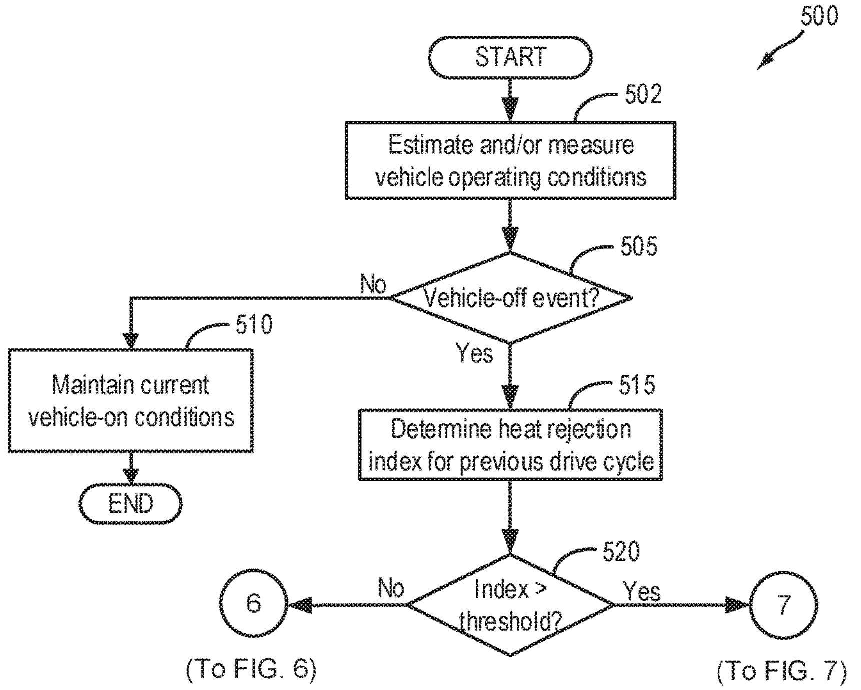
FIG. 5 shows a flowchart for a high level example method for determining whether to conduct an engine off natural vacuum test or an evaporative emissions test based on ambient light amount.

Turning now to FIG. 5, a flow chart for a high level example method 500 for determining whether to conduct an engine-off natural vacuum (EONV) test on a vehicle fuel system and evaporative emissions control system, is shown. More specifically, method 500 may be used to indicate a heat rejection index for a previous drive cycle responsive to an engine-off event. If the index is indicated to be greater than a threshold, method 500 may proceed with an engine-off natural vacuum test, whereas if the index is less than a threshold, method 500 may proceed with conducting an evaporative emissions test diagnostic based on changes in ambient light amount. Method 500 will be described with reference to the systems described herein and shown in FIG. 1 and FIG. 1, FIGS. 3A-3C, and FIG. 4A-4B, though it should be understood that similar methods may be applied to other systems without departing from the scope of this disclosure. Method 500 may be carried out by a controller, such as controller 12 in FIG. 1, and may be stored at the controller as executable instructions in non-transitory memory. Instructions for carrying out method 500 and the rest of the methods included herein may be executed by the controller based on instructions stored on a memory of the controller and in conjunction with signals received from sensors of the engine system, such as the sensors described above with reference to FIG. 1, FIG. 3A, and FIG. 4A. The controller may employ fuel system and evaporative emissions system actuators, such as canister purge valve (e.g., 112) and canister vent valve (e.g., 114), according to the method below.

Method 500 begins at 502 and includes evaluating current operating conditions. Operating conditions may be estimated, measured, and/or inferred, and may include one or more vehicle conditions, such as vehicle speed, vehicle location, etc., various engine conditions, such as engine status, engine load, engine speed, A/F ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc. Continuing at 505, method 500 may include determining whether a vehicle-off event has occurred. The vehicle-off event may include a key-off event. The vehicle-off event may follow a vehicle run time duration, the vehicle run time duration commencing at a previous vehicle-on event. If no vehicle-off event is detected, method 500 may proceed to 510. At 510, method 500 includes maintaining current vehicle-on conditions. For example, if the vehicle is being propelled via energy derived from a combustion engine, then such engine operating conditions may be maintained. Alternatively, if the vehicle is being propelled via energy derived via an onboard energy storage device such as a battery, such vehicle operating conditions may be maintained. Furthermore, valves may be maintained in their current state. For example, a canister purge valve (e.g., 112) may be maintained in an open conformation if open, for example if a purging event is in progress, or may be maintained closed if already closed. Furthermore, a canister vent valve (e.g., 114) may be maintained open if open, during vehicle operation. There may be some cases where the canister vent valve is closed during engine operation, such as an example condition where a vehicle-on evaporative emissions test is underway, and if the canister vent valve is indicated to be closed, it may be maintained closed at 510. At 510, method 500 may further include recording that a vehicle-off evaporative emissions test diagnostic procedure was not executed, and further may include setting a flag to retry an evaporative emissions test procedure at the next detected vehicle-off event. Method 500 may then end.

Returning to 505, if a vehicle-off event is indicated, method 500 may proceed to 515. At 515, method 500 may include determining a heat rejection index (HRI) for the previous drive cycle. In some examples, the heat rejection index may be based on a drive cycle aggressiveness index. The drive cycle aggressiveness index may be based on an amount of heat rejected by the engine during the previous drive cycle, the timing of the heat rejected, the length of time spent at differing levels of drive aggressiveness, ambient conditions, etc. The heat rejected by the engine may be based on one or more of engine load, fuel injected summed over time, and/or intake manifold air mass summed over time, miles driven, etc. Following determining the heat rejection index at 515, method 500 may proceed to 520.

At 520, method 500 includes determining an HRI threshold. In one example, a 3D lookup table stored at the vehicle controller may be used to adjust the HRI threshold based on the level of fuel in the fuel tank and the ambient temperature. The HRI threshold may thus represent a value for which an executed engine-off natural vacuum (EONV) test is likely to provide robust results. For example, based on the heat rejection index threshold, it may be inferred whether a pressure increase in the fuel system and evaporative emissions system would be below an expected pressure threshold level if the fuel system and evaporative emissions system were sealed following an engine-off event. For example, the HRI threshold may comprise an amount of air mass summation (lbs.) over a previous drive cycle, the air mass summation amount based on an indicated ambient temperature, and an indicated fuel level. As such, for a given ambient temperature (° F.), the HRI threshold may comprise a greater amount of air mass summation during a previous drive cycle for a fuel tank with a high fill level, and a lower amount of air mass summation for a fuel tank with a low fill level. Note that the above example of indicating an HRI threshold is one illustrative example, and is not meant to be limiting. For example, the HRI threshold may alternatively comprise a predetermined threshold, such as a number of miles driven, an amount of fuel injected summed over time, air mass summation over time, etc. Additionally or alternatively, any combination of engine load, fuel injected summed over time, air mass summation, miles driven, fuel level, ambient temperature, etc., that may indicate an amount of heat rejected to the engine over time, may be utilized to determine the HRI threshold. Accordingly, at 520, method 500 includes indicating whether the HRI is greater than or equal to the threshold value. If the HRI is greater than or equal to the threshold, method 500 may proceed to method 600 depicted in FIG. 6, which may include conducting an EONV test, as will be described in further detail below. Alternatively, if the HRI is indicated to be less than the threshold, method 500 may proceed to method 700 depicted in FIG. 7, which may include conducting a vehicle-off evaporative emissions test diagnostic procedure based on an ambient light amount, as discussed in further detail below.

Figure 6:
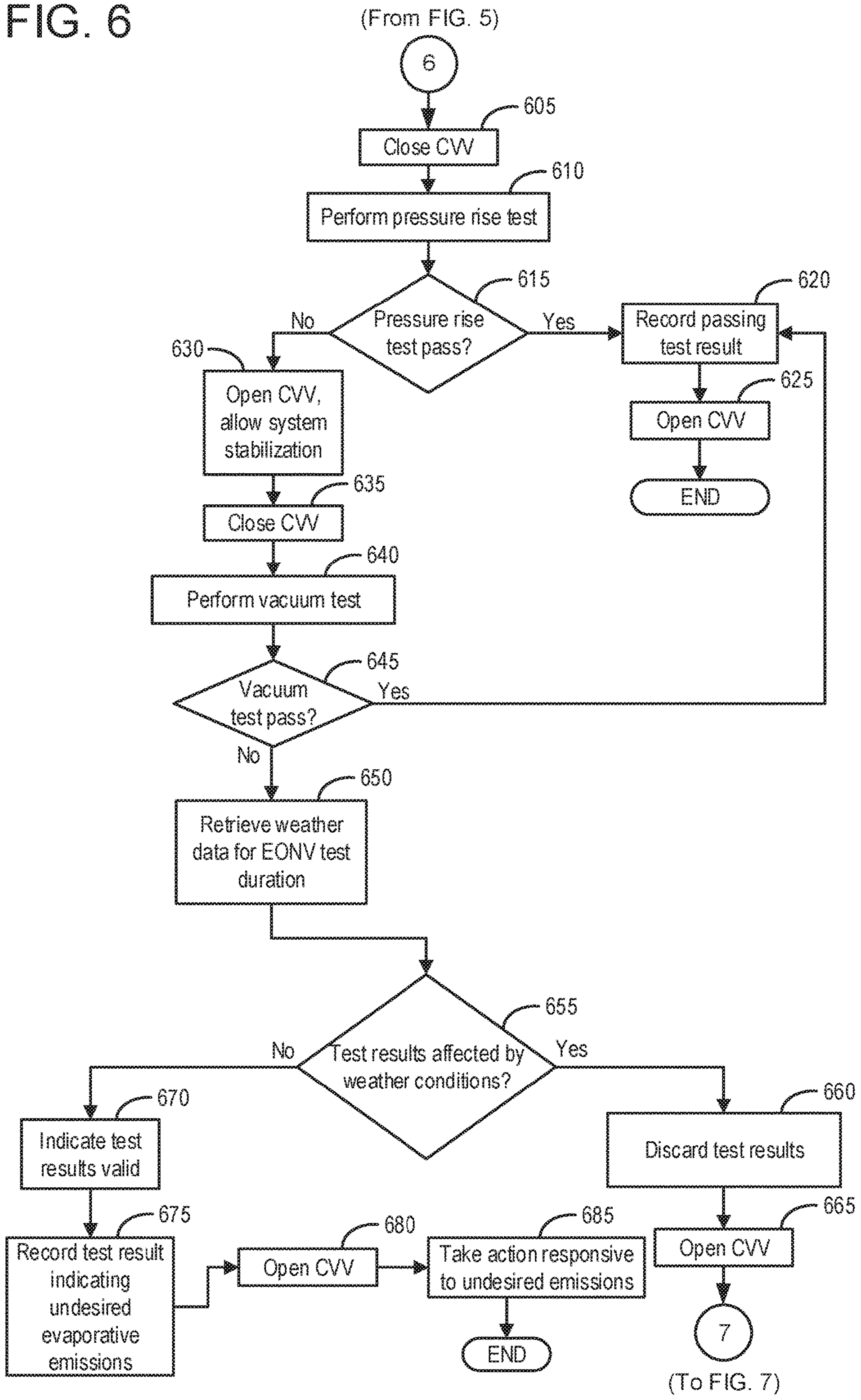
FIG. 6 shows a flowchart for a high level example method for conducting an engine off natural vacuum test at a vehicle-off event.

Turning now to FIG. 6, a flow chart for a high-level example method 600 for conducting an engine-off natural vacuum (EONV) test is shown. More specifically, method 600 proceeds from method 500, and includes conducting an EONV test responsive to an indication (from method 500) that an indicated heat rejection index from a previous drive cycle is greater than a threshold. Conducting the EONV test may include sealing a vehicle fuel system and evaporative emissions control system from atmosphere, monitoring a pressure increase in the fuel system and evaporative emissions control system, and indicating an absence of undesired evaporative emissions responsive to the pressure increase above a predetermined pressure-build threshold; and responsive to the pressure increase below the predetermined pressure-build threshold, unsealing the fuel system and evaporative emissions system to allow pressure in the fuel system and evaporative emissions control system to return to atmospheric pressure, resealing the fuel system and evaporative emissions control system; and indicating an absence of undesired evaporative emissions responsive to development of a vacuum-build greater than a predetermined vacuum-build threshold. Method 600 will be described with reference to the systems described herein and shown in FIG. 1, though it should be understood that similar methods may be applied to other systems without departing from the scope of this disclosure. Method 600 may be carried out by a controller, such as controller 12 in FIG. 1, and may be stored at the controller as executable instructions in non-transitory memory. Instructions for carrying out method 600 and the rest of the methods included herein may be executed by the controller based on instructions stored on a memory of the controller and in conjunction with signals received from sensors of the engine system, such as the sensors described above with reference to FIG. 1. The controller may employ fuel system and evaporative emissions system actuators, such as canister purge valve (e.g., 112), canister vent valve (e.g., 114), and fuel tank isolation valve (e.g., 110), where included, according to the method below.

Method 600 begins at 605 and may include closing a canister vent valve. If included, a fuel tank isolation valve may be commanded open, in order to couple the fuel system to the evaporative emissions system such that changes in fuel tank pressure may be communicated to the evaporative emissions control system. However, a fuel tank isolation valve may not be included, and in such an example closing the CVV may thus seal the evaporative emissions control system and fuel system together. Furthermore, while not explicitly illustrated in method 600, the status of a canister purge valve may also be assessed and closed if open. Method 600 may then proceed to 610.

At 610, method 600 may include performing a pressure rise test. While the engine is still cooling down subsequent to a vehicle-off event, there may be additional heat rejected to the fuel tank, as discussed above with regard to method 500 depicted in FIG. 5. With the fuel system and evaporative emissions control system sealed via the closing of the CVV, pressure in the fuel tank may rise due to fuel volatizing with increased temperature. The pressure rise test may include monitoring fuel tank pressure for a period of time. Fuel tank pressure may be monitored until the pressure reaches a threshold, the threshold pressure indicative of no leaks above a threshold size in the fuel tank. The threshold pressure may be based on the current conditions, including the ambient temperature, fuel level, fuel volatility, etc. In some examples, a rate of pressure change may be compared to an expected rate of pressure change. In some examples, such as when undesired evaporative emissions are present in the fuel system and/or evaporative emissions control system, or where external factors may prevent a pressure rise to the threshold, fuel tank pressure may not reach the threshold pressure. Rather the fuel tank pressure may be monitored for a predetermined amount of time, or an amount of time based on the current conditions. The fuel tank pressure may be monitored until consecutive measurements are within a threshold amount of each other, or until one or more pressure measurement(s) are less than a previous pressure measurement. In some examples, fuel tank pressure may be monitored until the fuel tank temperature stabilizes. Method 600 may then proceed to 615.

At 615, method 600 may include determining whether the pressure rise test ended due to a passing result, such as the fuel tank pressure reaching a pressure threshold. If the pressure rise test resulted in a passing result, method 600 may proceed to 620. At 620, method 600 may include recording the passing test result. Continuing at 625, method 600 may include opening the canister vent valve. In this way, the fuel system pressure may be returned to atmospheric pressure. If the vehicle system includes a fuel tank isolation valve, the isolation valve may be maintained open while pressure in the fuel system is returned to atmospheric pressure, whereupon reaching atmospheric pressure the fuel tank isolation valve may be commanded closed. Method 600 may then end.

Returning to 615, if the pressure rise test did not result in a pass, method 600 may proceed to 630. At 630, method 600 may include opening the CVV and allowing the system to stabilize. Opening the CVV may allow the fuel system pressure to equilibrate to atmospheric pressure. If included, a fuel tank isolation valve may additionally be maintained open to allow the fuel system and evaporative emission system pressure to equilibrate to atmospheric pressure. The system may be allowed to stabilize until the fuel tank pressure reaches atmospheric pressure, and/or until consecutive pressure readings are within a threshold of each other. Method 600 may then proceed to 635.

At 635, method 600 may include closing the CVV. If included, a fuel tank isolation valve may be maintained open at 635. In this way, the fuel system and evaporative emissions system may be isolated from atmosphere. As the fuel in the fuel tank cools, fuel vapors should condense into liquid fuel, creating a vacuum within the sealed fuel system and evaporative emissions system. Continuing at 640, method 600 may include performing a vacuum test. Performing a vacuum test may include monitoring pressure in the fuel system and evaporative emissions system for a duration. The pressure may be monitored until the vacuum reaches a threshold, the threshold vacuum indicative of no leaks above a threshold size in the fuel system and evaporative emissions system. The threshold vacuum may be based on the current conditions, including the ambient temperature, the fuel level, the fuel volatility, etc. In some examples, the rate of pressure change may be compared to an expected rate of pressure change. The fuel tank pressure may not reach the threshold vacuum. Rather the fuel tank pressure may be monitored for a predetermined duration, or a duration based on the current conditions.

Continuing at 645, method 600 may include determining whether a passing result was indicated for the vacuum test, such as the fuel tank vacuum reaching a pressure threshold. If the vacuum test resulted in a passing result, method 600 may proceed to 620. At 620, method 600 may include recording the passing test result. Continuing at 625, method 600 may include opening the canister vent valve. In this way, the fuel system pressure may be returned to atmospheric pressure. If the vehicle system includes a fuel tank isolation valve, the isolation valve may be maintained open while pressure in the fuel system is returned to atmospheric pressure, whereupon reaching atmospheric pressure the fuel tank isolation valve may be commanded closed. Method 600 may then end.

Returning to 645, if a passing result was not indicated for either the pressure rise test or the vacuum test, method 600 may proceed to 650. At 650, method 600 may include retrieving weather data for the EONV test duration. As discussed above, the vehicle control system (e.g., 14) may be communicatively coupled to an off-board computing system 99 such as a network or cloud computing system via wireless communication, which may be Wi-Fi, Bluetooth, a type of cellular service, or a wireless data transfer protocol. As such, weather information may be retrieved from one or more data servers, including government and/or private data collection services that provide historic and forecast weather data in a retrievable format, for example, via an application programming interface. The weather information retrieved may be based on the location of the vehicle as determined by an on-board GPS. For example, data from the nearest available weather stations may be retrieved. The retrieved data may include temperature, humidity, barometric pressure, precipitation, wind, etc. and may include metadata indicating time, day, year, location, etc. Controller 12 may process the data to extract the relevant data from the EONV test period, and further to export the data to a format where it can be analyzed and compared to data recorded during the EONV test.

Proceeding to 655, method 600 may include determining whether the EONV test results may have been affected by current weather conditions. For example, while entry into the EONV test was based on a heat rejection index being above a threshold at step 520 of method 500, certain weather conditions may prevent heat from the engine at a vehicle-off event from further pressurizing the fuel system and evaporative emissions system, and/or may affect development of a vacuum responsive to the pressure rise test not passing. Such example weather conditions may include snow, heavy wind, rain, etc. As such, at 655, if it is indicated that weather conditions may have negatively affected the EONV test, then method 600 may proceed to 660. At 660, method 600 may include discarding the test results, and may include setting a flag at the controller indicating that an EONV test conducted, but that the results of the test are not valid due to external weather conditions.

Method 600 may thus proceed to 665, and may include commanding open the CVV. As described above, opening the CVV may allow the fuel system pressure to equilibrate to atmospheric pressure. If included, a fuel tank isolation valve may additionally be maintained open to allow the fuel system and evaporative emission system pressure to equilibrate to atmospheric pressure. In some examples, the fuel tank isolation valve may be closed responsive to the fuel system and evaporative emissions system reaching atmospheric pressure. However, in other examples the fuel tank isolation valve may be maintained open during vehicle-off conditions.

Figure 7:
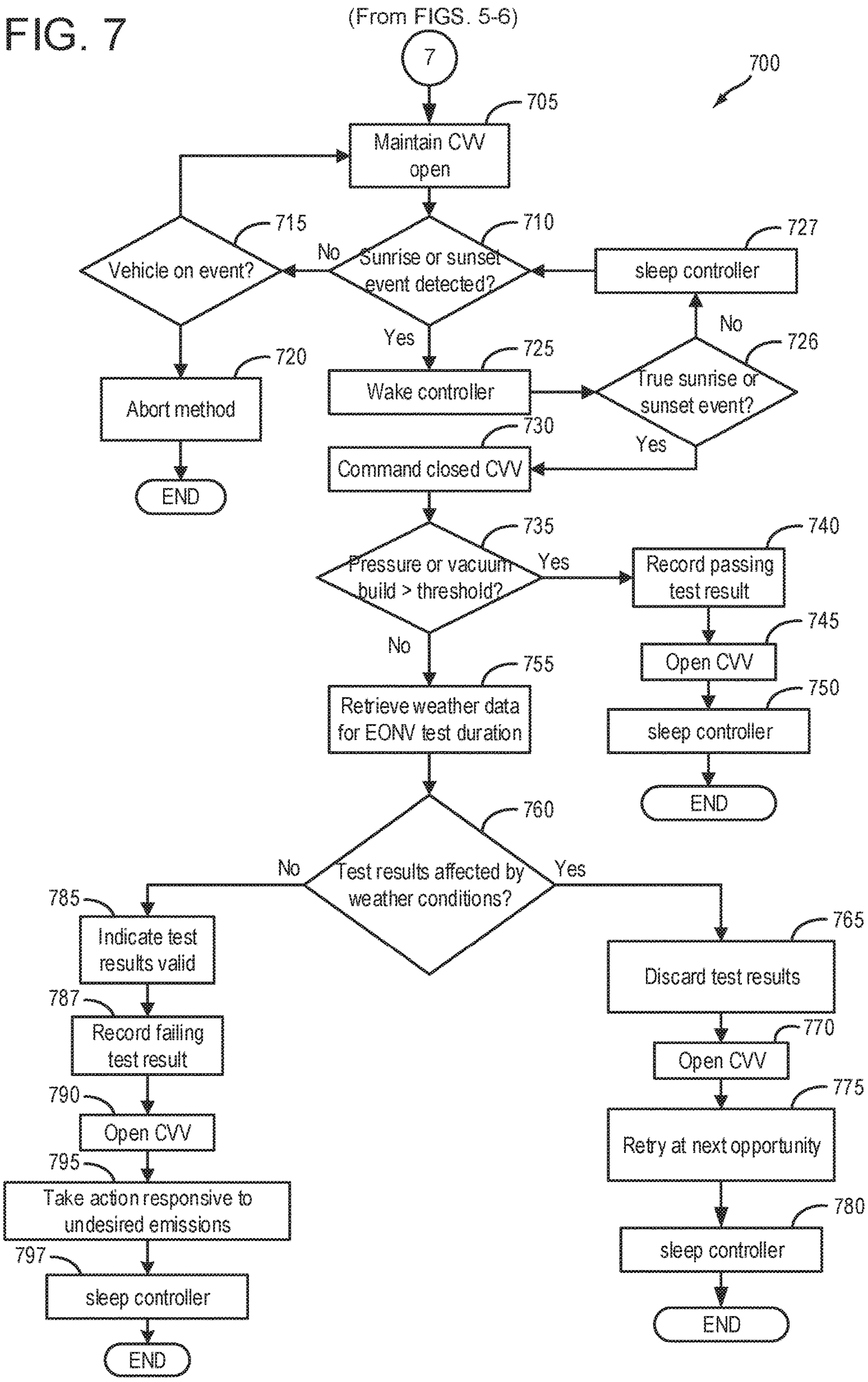
FIG. 7 shows a flowchart for a high level example method for conducting an evaporative emissions test diagnostic procedure based on an ambient light amount.
Figure 8:
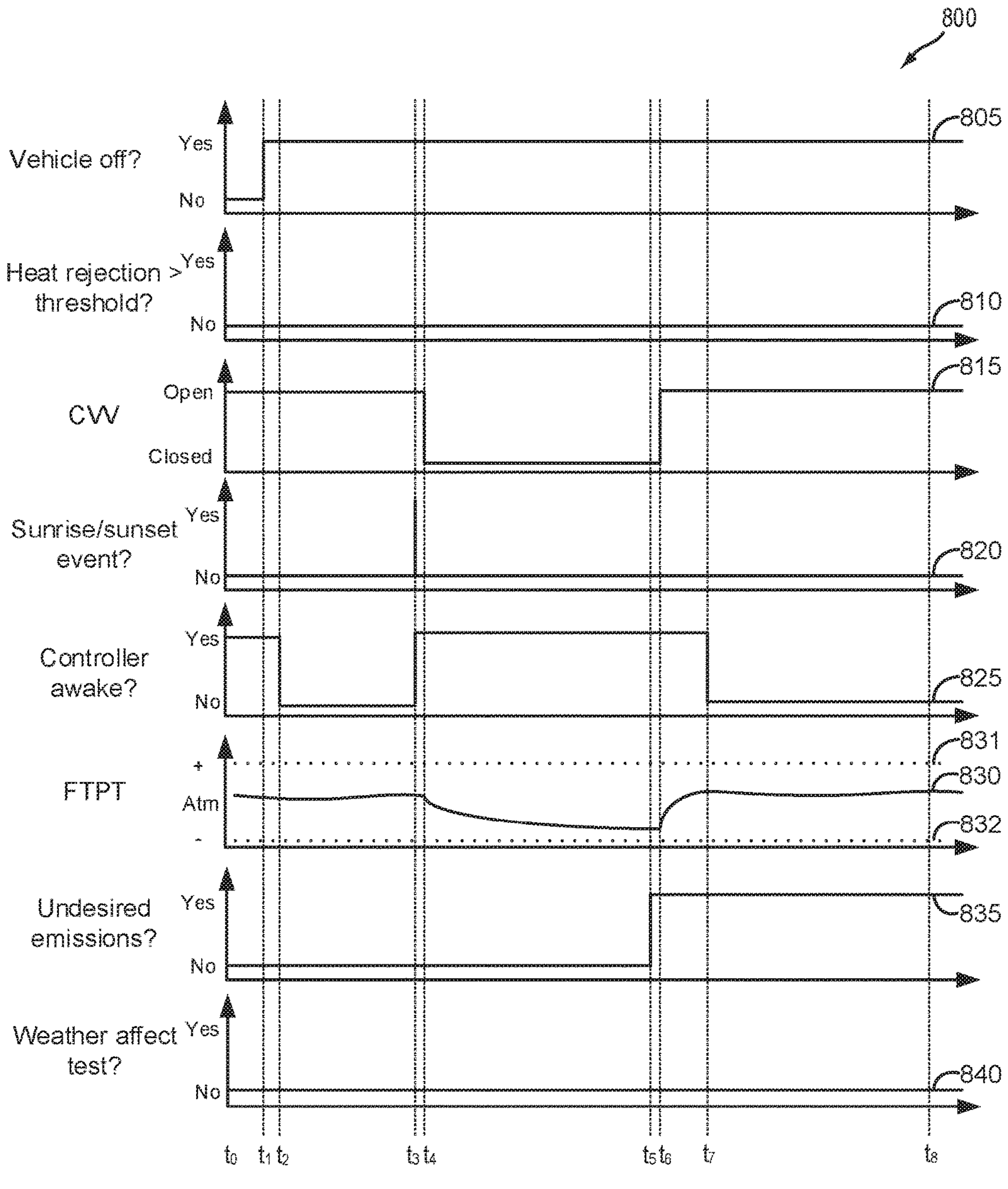
FIG. 8 shows an example timeline illustrating an evaporative emissions test diagnostic procedure based on an ambient light amount, according to the method illustrated in FIG. 7.

As the EONV test did not provide conclusive results as a result of weather conditions negatively impacting the test, method 600 may proceed to method 700, depicted in FIG. 7. More specifically, because the EONV test was impacted by local weather conditions such that the results of the test are not conclusive, it may be desirable to conduct another evaporative emissions system test at a later time that is not dependent on heat rejection from the engine, and which may occur at a later time when weather conditions may be less likely to impact the test, as the result of changing weather patterns, etc. Accordingly, method 700, as discussed above and which will be discussed in greater detail below, may be utilized in order to conduct an evaporative emissions test diagnostic procedure based on a change in ambient light amount. The use of such a method may require the vehicle to be parked for a duration long enough for the vehicle to experience a change in ambient light conditions, and as such, if a vehicle-on event is indicated prior, then the method may be aborted. However, if the vehicle is parked for a duration long enough to experience an ambient light change, then by proceeding with method 700, an evaporative emissions test diagnostic may be completed in some examples wherein the EONV tests were discarded, thus increasing a test completion frequency.

Returning to 655, if the results of the EONV test were not indicated to have been negatively impacted by local weather conditions, then method 600 may proceed to 670. At 670 method 600 may include indicating that the test results are valid, and at 675 method 600 may further include recording the result of the EONV test at the controller, where the results of the EONV test indicate the presence of undesired evaporative emissions in the fuel system/evaporative emissions control system. Proceeding to 680, method 600 may include commanding open the CVV. As discussed above, opening the CVV may allow the fuel system and evaporative emissions system pressure to equilibrate to atmospheric pressure. If included, a fuel tank isolation valve may additionally be maintained open to allow the fuel system and evaporative emission system pressure to equilibrate to atmospheric pressure. In some examples, the fuel tank isolation valve, if included, may be closed responsive to the fuel system and evaporative emissions system reaching atmospheric pressure. However, in other examples the fuel tank isolation valve may be maintained open during vehicle-off conditions, as described above.

Proceeding to 685, method 600 may include taking an action responsive to the indicated presence of undesired evaporative emissions in the fuel system/evaporative emissions control system. In one example, taking an action may include illuminating a malfunction indicator light (MIL) on a vehicle dashboard in order to alert a vehicle operator of the need to service the vehicle. In another example, taking an action may additionally include updating a canister purge schedule based on the indication of undesired evaporative emissions. For example, canister purge operations may be scheduled to be conducted more frequently, such that vapors in the fuel system and/or evaporative emissions system may be purged to engine intake for combustion, rather than being released to atmosphere. Method 600 may then end.

Turning now to FIG. 7, a flow chart for a high-level example method 700 for conducting an evaporative emissions test diagnostic based on an ambient light amount, is shown. More specifically, method 700 may continue from method 500 depicted in FIG. 5, or from method 600 depicted in FIG. 6, and may include conducting an evaporative emissions test diagnostic responsive to a detected sunrise or sunset event. In one example, it may be determined that a heat rejection index is below a threshold, and thus an EONV test may not be conducted at a vehicle-off event. Instead, method 700 may be used in order to conduct an evaporative emissions test diagnostic responsive to a change in ambient light. In another example, an EONV test may be conducted, yet results of the test may be discarded due to indicated weather events affecting the outcome of the EONV test. Thus, method 700 may be used in order to conduct another evaporative emissions test during the vehicle-off condition, responsive to the vehicle being maintained off for sufficient duration to experience an ambient light change. Method 700 will be described with reference to the systems described herein and shown in FIG. 1, though it should be understood that similar methods may be applied to other systems without departing from the scope of this disclosure. Method 700 may be carried out by a controller, such as controller 12 in FIG. 1, and may be stored at the controller as executable instructions in non-transitory memory. Instructions for carrying out parts of method 700 and the rest of the methods included herein may be executed by the controller based on instructions stored on a memory of the controller and in conjunction with signals received from sensors of the engine system, such as the sensors described above with reference to FIG. 1. The controller may employ fuel system and evaporative emissions system actuators, such as canister purge valve (e.g., 112), canister vent valve (e.g. 114), and fuel tank isolation valve (e.g., 110), where included, according to the method below.

Method 700 begins at 705 and may include maintaining the canister vent valve (CVV) open. Step 705 may be carried out by the controller (e.g., 12). Proceeding to 710, method 700 may include indicating whether a sunrise or sunset event is detected. In other words, at step 710, it may be indicated whether a change in ambient light amount is detected. As discussed above with regard to FIG. 4A and FIG. 4B, such an event may be indicated while the controller is asleep, via feeding output from a solar cell (e.g., 302) mounted on the vehicle into circuitry designed to wake the controller responsive to a detected change in ambient light amount. If, at 710, a change in ambient light amount is not detected, method 700 may proceed to 715, and may include indicating whether a vehicle-on event has occurred. For example, a vehicle-on event may include a key-on event, a remote-start event, etc. If, at 715, a vehicle-on event is indicated, method 700 may proceed to 720, wherein method 700 may be aborted. While method 700 illustrates that a vehicle-on event may be sufficient to abort method 700 at step 720, it may be understood that, while not explicitly illustrated, a vehicle-on event detected at any point during method 700 may be sufficient to abort the method. If a vehicle-on event is not detected, method 700 may return to 705 and may include maintaining open the CVV.

If, at 710, a sunrise or sunset is indicated (as indicated by a change in ambient light amount), method 700 may proceed to 725. At 725, method 700 may include waking the controller. As described above with regard to FIG. 4A and FIG. 4B, an input (d) voltage based on output from a solar cell (e.g., 302) may be processed by an edge detector (e.g., 420), and in response to a rising or falling edge (indicating a sunrise or sunset event) edge detector output (det) (e.g., 426) may pulse high. Edge detector output (det) pulsing high may trigger a wake module (e.g., 430) to wake the controller of the vehicle.

Proceeding to 726, method 700 may include indicating whether the indicated sunrise or sunset event corresponds to a true sunrise or sunset event, and not for example, an ambient light change due to events other than a sunrise or sunset event. Such an ambient light change that is not due to a sunrise or sunset event may include a vehicle being parked in a dark garage where a light is turned on (e.g., a false sunrise event). Another example may include a vehicle operator driving from a sunny environment into a dark garage (e.g., a false sunset event). Accordingly, responsive to the controller being woken up at 725, at 726 method 700 may include receiving information regarding the location of the vehicle from an on-board GPS system, and correlating the indicated sunrise/sunset event with vehicle location and local time. In some examples such information may be cross-referenced to information available via the internet to determine precise sunrise/sunset times based on the vehicle location. As such, it may be indicated whether the indicated sunrise or sunset event corresponds to a true sunrise or sunset event. In another additional or alternative example, the indicated sunrise or sunset event may be correlated with an ambient temperature change within a predetermined timeframe of the indicated sunrise or sunset event. Such information may be retrieved from an ambient temperature sensor history stored in the vehicle controller, for example. Such information may additionally or alternatively be retrieved wirelessly from the internet, for example, from data made available from the nearest available weather stations, where a local temperature may be obtained for within the predetermined timeframe of the indicated sunrise or sunset event. If the indications of ambient temperature change during the predetermined timeframe are not consistent with a sunrise or sunset event, it may be determined that the indicated sunrise or sunset event does not correspond to a true sunrise or sunset event. In still further examples, a rate of change in the output of the solar cell may be indicated responsive to an indication of a sunrise or sunset event. If the rate of change in the output is greater than expected for a sunrise or sunset event, then it may be determined that the indicated sunrise or sunset event does not correspond to a true sunrise or sunset event.

Accordingly, at 726, if a true sunrise or sunset event is not indicated, method 700 may proceed to 727 and may include sleeping the controller. With the controller asleep, method 700 may thus return to 710, where it may again be indicated whether a sunrise or sunset event is detected, as described above.

Alternatively, at 726, if it is determined that the sunrise or sunset event corresponds to a true sunrise or sunset event, method 700 may proceed to 730. At 730, method 700 may include commanding closed the CVV. Accordingly, with the controller awake, step 730 may be carried out by the controller. By commanding closed the CVV, the vehicle fuel system and evaporative emissions control system may be isolated from atmosphere. While not explicitly illustrated in method 700, it may be understood that a canister purge valve (CPV) (e.g., 112) may be maintained in a closed conformation, thus additionally isolating the fuel system and evaporative emissions control system from engine intake. Furthermore, while not explicitly illustrated, if a fuel tank isolation valve (FTIV) (e.g., 110) is included in the vehicle, the FTIV may be commanded open prior to commanding closed the CVV. By commanding open the FTIV the vehicle fuel system may be coupled to the evaporative emissions control system, such that an evaporative emissions test diagnostic may be conducted on both the fuel system and the evaporative emissions system concurrently.

Proceeding to 735, with the fuel system and evaporative emissions control system isolated from atmosphere and from engine intake, pressure may be monitored. In one example, pressure may be monitored by a fuel tank pressure transducer (e.g., 120), as described above with regard to FIG. 1. Depending on whether the change in ambient light amount detected at step 710 corresponds to a sunrise event, or to a sunset event, pressure in the fuel system and evaporative emissions system may be monitored for a pressure build, or a vacuum build, respectively. As discussed above with regard to FIG. 2 a sunrise event (e.g., 204) marks a time of day near where a heat gain cycle is at its greatest, and thus pressure in the sealed fuel system and evaporative emissions control system may be monitored for a positive pressure build. Alternatively, a sunset event (e.g., 206) marks a time of day near where a heat loss cycle is at its greatest, and thus pressure in the sealed fuel system and evaporative emissions control system may be monitored for a negative pressure (e.g., vacuum) build.

As such, responsive to a sunrise event, pressure in the fuel tank may rise due to fuel volatizing with increased temperature. A pressure rise test may include monitoring fuel tank pressure for a period of time. Fuel tank pressure may be monitored until the pressure reaches a threshold, the threshold pressure indicative of no leaks above a threshold size in the fuel tank. The threshold pressure may be based on the current conditions, including the ambient temperature, fuel level, fuel volatility, etc. In some examples, a rate of pressure change may be compared to an expected rate of pressure change. In some examples, such as when undesired evaporative emissions are present in the fuel system and/or evaporative emissions control system, or where external factors may prevent a pressure rise to the threshold, fuel tank pressure may not reach the threshold pressure. Rather the fuel tank pressure may be monitored for a predetermined amount of time, or an amount of time based on the current conditions. The fuel tank pressure may be monitored until consecutive measurements are within a threshold amount of each other, or until one or more pressure measurement(s) are less than a previous pressure measurement. In some examples, fuel tank pressure may be monitored until the fuel tank temperature stabilizes.

Alternatively, responsive to a sunset event, pressure in the fuel tank may decrease due to fuel vapor condensing with decreased temperature. As such, a vacuum-build test may include monitoring pressure in the fuel system and evaporative emissions system for a duration. The pressure may be monitored until the vacuum reaches a threshold, the threshold vacuum indicative of no leaks above a threshold size in the fuel system and evaporative emissions system. The threshold vacuum may be based on the current conditions, including the ambient temperature, the fuel level, the fuel volatility, etc. In some examples, the rate of pressure change may be compared to an expected rate of pressure change. In some examples, such as when undesired evaporative emissions are present in the fuel system and/or evaporative emissions control system, or where external factors may prevent a vacuum build to the threshold, pressure in the fuel system and evaporative emissions system may not reach the threshold vacuum. Rather the pressure may be monitored for a predetermined amount of time, or an amount of time based on the current conditions. Pressure in the fuel system and evaporative emissions system may be monitored until consecutive measurements are within a threshold amount of each other, or until one or more pressure measurement(s) are greater than a previous pressure measurement. In some examples, pressure in the fuel system and evaporative emissions system may be monitored until the fuel tank temperature stabilizes.

Accordingly, at 735, method 700 includes indicating whether a pressure build or a vacuum build in the fuel system and evaporative emissions system has reached either a pressure build threshold or a vacuum build threshold.

Responsive to an indication that either the pressure build threshold or the vacuum build threshold has been reached at 735, method 700 may proceed to 740. At 740, method 700 may include recording the passing test result at the controller. Continuing at 745, method 700 may include commanding open the canister vent valve. In this way, pressure in the fuel system and evaporative emissions system may be returned to atmospheric pressure. If the vehicle fuel system includes a fuel tank isolation valve, the isolation valve may be maintained open while pressure in the fuel system is returned to atmospheric pressure, whereupon reaching atmospheric pressure the fuel tank isolation valve may be commanded closed.

Proceeding to step 750, method 700 may include sleeping the controller. By sleeping the controller while the vehicle is off, and only waking the controller in order to conduct the evaporative emissions test diagnostic, battery supply may be conserved. Method 700 may then end.

Returning to 735, if it is indicated that either pressure build or vacuum build in the fuel system and evaporative emissions system did not reach the pressure-build threshold, or vacuum-build threshold, respectively, method 700 may proceed to 755. At 755, method 700 may include retrieving weather data for the duration of the pressure or vacuum build. As discussed above, weather information may be retrieved from one or more data servers, including government and/or private data collection services that provide historic and forecast weather data in a retrievable format, for example, via an application programming interface. The weather information retrieved may be based on the location of the vehicle as determined by an on-board GPS. For example, data from the nearest available weather stations may be retrieved. The retrieved data may include temperature, humidity, barometric pressure, precipitation, wind, etc. and may include metadata indicating time, day, year, location, etc. Controller 12 may process the data to extract the relevant data from the test period, and further to export the data to a format where it can be analyzed and compared to data recorded during the evaporative emissions test diagnostic procedure.

Proceeding to 760, method 700 may include determining whether the results of the evaporative emissions test diagnostic may have been affected by current weather conditions. As discussed above, certain weather conditions may counteract a pressure-build or a vacuum-build in a sealed fuel system and evaporative emissions system, thus negatively impacting the results of a test diagnostic. Accordingly, if at 760 it is indicated that weather conditions may have negatively affected the test results, method 700 may proceed to 765. At 765, method 700 may include discarding the test results, and may include setting a flag at the controller indicating that an evaporative emissions test diagnostic was conducted based on a sunrise or sunset event, but that the results of the test are not valid due to external weather conditions.

Method 700 may thus proceed to 770, and may include commanding open the CVV. As described above, opening the CVV may allow the fuel system pressure to equilibrate to atmospheric pressure. If included, a fuel tank isolation valve may additionally be maintained open to allow the fuel system and evaporative emission system pressure to equilibrate to atmospheric pressure. In some examples, the fuel tank isolation valve may be closed responsive to the fuel system and evaporative emissions system reaching atmospheric pressure. However, in other examples the fuel tank isolation valve may be maintained open during vehicle-off conditions.

Proceeding to 775, method 700 may include updating an evaporative emissions test schedule responsive to an evaporative emissions test diagnostic being conducted but where the results of the test were discarded due to indicated weather conditions. As such, at 775, method 700 may include scheduling an evaporative emissions test to be conducted at the next opportunity. For example, an evaporative emissions test may be scheduled for the next vehicle-off event responsive to an indication of a heat rejection index above a threshold, as discussed above with regard to FIG. 5. If, a heat rejection index is not indicated to be above the threshold at the next vehicle off event, another evaporative emissions test may be scheduled based on a change in ambient light amount. In still other examples, a vehicle-on evaporative emissions test may be scheduled, such that it may be determined whether undesired evaporative emissions are present in the fuel system and evaporative emissions system during the next drive cycle. Such an example may include evacuating the fuel system and evaporative emissions system using intake manifold vacuum during an engine-on condition, sealing the fuel system and evaporative emissions system responsive to a threshold vacuum being reached, and monitoring pressure bleed-up. A pressure bleed-up below a threshold, or a pressure bleed-up rate less than a threshold bleed-up rate may be indicative of an absence of undesired evaporative emissions.

Proceeding to 780, method 700 may include sleeping the controller. As discussed above, by sleeping the controller while the vehicle is off, and only waking the controller in order to conduct the evaporative emissions test diagnostic, battery supply may be conserved. Method 700 may then end.

Returning to 760, if the results of the evaporative emissions test diagnostic were not indicated to have been negatively impacted by local weather condition, then method 700 may proceed to 785. At 785 method 700 may include indicating that the test results are valid, and at 787 method 700 may further include recording the results of the test at the controller, where the results indicate the presence of undesired evaporative emissions in the fuel system and evaporative emissions control system. Proceeding to 790, method 700 may include commanding open the CVV. As discussed above, opening the CVV may allow the fuel system and evaporative emissions system pressure to equilibrate to atmospheric pressure. If included, a fuel tank isolation valve may additionally be maintained open to allow the fuel system and evaporative emission system pressure to equilibrate to atmospheric pressure. In some examples, the fuel tank isolation valve, if included, may be closed responsive to the fuel system and evaporative emissions system reaching atmospheric pressure. However, in other examples the fuel tank isolation valve may be maintained open during vehicle-off conditions, as described above.

Proceeding to 795, method 700 may include taking an action responsive to the indicated presence of undesired evaporative emissions in the fuel system/evaporative emissions control system. In one example, taking an action may include illuminating a malfunction indicator light (MIL) on a vehicle dashboard in order to alert a vehicle operator of the need to service the vehicle. In another example, taking an action may additionally include updating a canister purge schedule based on the indication of undesired evaporative emissions. For example, canister purge operations may be scheduled to be conducted more frequently, such that vapors in the fuel system and/or evaporative emissions system may be purged to engine intake for combustion, rather than being released to atmosphere.

Continuing to 797, method 700 may include sleeping the controller. As discussed above, by sleeping the controller while the vehicle is off, and only waking the controller in order to conduct the evaporative emissions test diagnostic, battery supply may be conserved. Method 700 may then end.

FIG. 8 depicts an example timeline 800 for conducting an evaporative emissions test diagnostic procedure on a vehicle fuel system and evaporative emissions system during a vehicle-off condition where a heat rejection index is indicated to be below a threshold, using the method depicted in FIG. 5 and FIG. 7. Timeline 800 includes plot 805, indicating whether a vehicle is in an off-state, or whether the vehicle is in operation, over time. Timeline 800 further includes plot 810, indicating whether a heat rejection index at a vehicle-off event is above a threshold, over time. For example, as discussed above, a heat rejection index may be determined for a previous drive cycle, where the heat rejection index may be based on drive cycle aggressiveness, and where the threshold may represent a value for which an executed engine-off natural vacuum (EONV) test is likely to provide robust results. Timeline 800 further includes plot 815, indicating whether a canister vent valve (CVV) (e.g., 114) is in an open, or closed conformation, over time. Timeline 800 further includes plot 820, indicating whether a sunrise or sunset event is indicated, over time. As described above with regard to FIG. 3A-3C, and FIG. 4A-4B, a sunrise/sunset event may be indicated by an edge detector coupled to input from a solar cell. Responsive to an indicated sunrise or sunset event, a vehicle controller may be woken up from a sleep state. As such, timeline 800 further includes plot 825, indicating whether the vehicle controller is awake, over time. Timeline 800 further includes plot 830, indicating pressure readings from a vehicle fuel tank pressure transducer (FTPT), over time. Line 831 represents a pressure-build threshold, where if reached during a sunrise event it may be indicated that the vehicle fuel system and evaporative emissions system are free from undesired evaporative emissions. Line 832 represents a vacuum-build threshold, where if reached during a sunset event it may be indicated that the vehicle fuel system and evaporative emissions system are free from undesired evaporative emissions. Accordingly, timeline 800 further includes plot 835, indicating whether undesired evaporative emissions are indicated, over time. Timeline 800 further includes plot 840, indicating whether an evaporative emissions test diagnostic procedure conducted on the vehicle was impacted by local weather conditions, over time.

At time t0, the vehicle is in operation, as indicated by plot 805. Accordingly, the CVV is in an open conformation, indicated by plot 815. With the CVV in an open conformation, pressure in the fuel system and evaporative emissions control system is near atmospheric pressure, indicated by plot 830. It may be understood that in some examples a fuel tank isolation valve (FTIV) (e.g. 110) may be included in the vehicle. In such an example, pressure in the fuel system may not be near atmospheric pressure when the FTIV is in a closed conformation and when the CVV is in an open conformation. However, in this example illustration it may be understood that an FTIV is not included in the vehicle. Accordingly, the fuel system and evaporative emissions system may be understood to be coupled. However, an FTIV may be included in such a vehicle without departing from the scope of the present disclosure. For example, in a case where an FTIV is included, simply opening the FTIV may couple the fuel system to the evaporative emissions control system.

As the vehicle is in operation, the controller is awake, indicated by plot 825. Furthermore, as the vehicle is in operation, an evaporative emissions test diagnostic is not indicated, and thus a heat rejection index is not indicated to be above a threshold, indicated by plot 810. Similarly, a sunrise/sunset event is not indicated, as indicated by plot 820. Still further, undesired evaporative emissions are not indicated, illustrated by plot 835, and as a test is not being conducted, weather is not indicated to be affecting a test outcome, illustrated by plot 840.

At time t1, a vehicle-off event is indicated, illustrated by plot 805. With the vehicle transitioning to an off state, it may be determined whether a heat rejection index is greater than a threshold, as described above with regard to FIG. 5. However, at time t1 it is indicated that the heat rejection index is not above the threshold, illustrated by plot 810. As such, an engine off natural vacuum (EONV) test may not be initiated at time t1. If the heat rejection index was indicated to be above the threshold at time t1, an EONV test may be initiated, and conducted according to method 600 depicted above in FIG. 6. Because the heat rejection index is not indicated to be greater than the threshold, the CVV is maintained open, indicated by plot 815, and the controller is put to sleep at time t2, indicated by plot 825.

Between time t2 and t3, the controller is maintained asleep, and pressure in the fuel system and evaporative emissions system remains near atmospheric pressure. At time t3, a sunrise/sunset event is indicated, resulting in a wakeup of the controller. As discussed above, a sunrise/sunset event may be indicated by an edge detector configured to sense a rising or falling edge based on output from a solar cell sensor. A rising edge may correspond to a sunrise event, where a falling edge may correspond to a sunset event, for example. As such, a change in ambient light such as that which occurs during a sunrise or sunset event may trigger a wakeup of the vehicle controller, as discussed above with regard to FIG. 4A and FIG. 4B. Furthermore, as described above with regard to FIG. 3B-3C and with regard to FIG. 4A-4B, edge detector output (det) which pulses high responsive to an indication of a rising or falling edge may be cleared at the next rising clock edge (clk). However, once the controller is woken up by the edge detector output pulsing high, the controller may be maintained on until an evaporative emissions test diagnostic is complete, and then it may be put back to sleep. As such, a sunrise/sunset event as depicted by plot 820 in timeline 800 is illustrated as a single pulse event, which triggers an awake of the controller, illustrated by plot 825. With the controller awake, at time t4 the CVV may be commanded closed, as illustrated by plot 815. By closing the CVV, the fuel system and evaporative emissions control system may be sealed from atmosphere. While not explicitly illustrated, it may be understood that a canister purge valve (CPV) (e.g., 112) may also be in a closed conformation. Furthermore, in a vehicle with an FTIV, prior to sealing the fuel system and evaporative emissions control system by closing the CVV, the FTIV may be commanded open to couple the fuel system to the evaporative emissions control system. However, in this example timeline, as discussed above, it may be understood that an FTIV is not included in the vehicle system.

With the CVV (and CPV) in a closed conformation, pressure in the fuel system and evaporative emissions control system may be monitored for a duration, as indicated by plot 830. As discussed above, pressure may be monitored by a fuel tank pressure transducer (FTPT) (e.g., 120). As such, between time t4 and t5, pressure in the fuel system and evaporative emissions system is indicated to drop. As the pressure in the fuel system and evaporative emissions control system drops between time t4 and t5, it may be understood that the event that triggered the wakeup of the controller may comprise a sunset event, where cooling of the fuel system may condense fuel vapors such that a vacuum builds in the fuel system and evaporative emissions control system. Accordingly, as discussed above, a vacuum-build test may include monitoring pressure in the fuel system and evaporative emissions system for a duration. A vacuum-build threshold, represented by line 832 may comprise a threshold where, if reached, an absence of undesired evaporative emissions may be indicated. The threshold may be based on current conditions including ambient temperature, fuel level, fuel volatility, etc. In another example a rate of pressure change may be compared to an expected rate of pressure change, where the expected rate is a pressure change rate in the absence of undesired evaporative emissions. In some examples, pressure in the fuel system and evaporative emissions control system may be monitored for a predetermined time duration, and may be further adjusted based on current conditions, such as ambient temperature, fuel level, fuel volatility, etc. In some examples, pressure may be monitored until consecutive measurements are within a threshold amount of each other, or until one or more pressure measurements are greater than a previous measurement, in the case where the threshold is not reached. In yet another example, pressure may be monitored until temperature in the fuel system is no longer changing.

As such, between time t4 and t5, a vacuum builds in the fuel system and evaporative emissions control system, yet the threshold vacuum-build is not reached. As such, at time t5 undesired evaporative emissions are indicated. At time t5 it may be further indicated whether external weather conditions may have been the reason that vacuum in the fuel system and evaporative emissions system did not build to the threshold. Such an indication may include obtaining weather information from one or more data servers, where the data retrieved may be based on a location of the vehicle as determined by an on-board GPS. The weather data may be compared to data obtained during the evaporative emissions test diagnostic in order to infer whether the results of the test were affected by weather conditions. However, in the example timeline 800, it is indicated that weather did not affect the outcome of the test results, and as such, undesired evaporative emissions are indicated at time t5, illustrated by plot 835. Such an indication may be recorded at the controller, and action may be taken to mitigate the effects of undesired evaporative emissions. For example, as discussed above, a malfunction indicator light (MIL) may be illuminated in order to alert a vehicle operator of the need to service the vehicle, and/or a canister purge schedule may be updated such that the purging operation is conducted more frequently such that vapors in the fuel system and/or evaporative emissions control system may be purge to engine intake for combustion, rather than being released to atmosphere.

At time t6, with the evaporative emissions test diagnostic complete, the CVV may be commanded open. By commanding open the CVV, pressure in the fuel system and evaporative emissions control system may be returned to atmospheric pressure. In a vehicle where an FTIV is included, the FTIV may be maintained open during returning the fuel system and evaporative emissions control system to atmospheric pressure, at which point the FTIV may be commanded closed, or maintained open. However, as discussed above, in this example timeline 800 it may be understood that an FTIV is not included in the vehicle system. As such, with the CVV commanded open at time t6, pressure in the fuel system and evaporative emissions control system may return to atmospheric pressure, indicated by plot 830. Responsive to pressure in the fuel system and evaporative emissions control system reaching atmospheric pressure, as monitored by the FTPT, the controller may be returned to sleep mode at time t7, as indicated by plot 825. With the evaporative emissions test diagnostic completed and the vehicle controller returned to sleep mode, between time t7 and t8 the vehicle is maintained off, and pressure in the fuel system and evaporative emissions control system remains near atmospheric pressure, the result of the open CVV.

In this way, responsive to an indication that an EONV test may not provide robust results at a vehicle-off event, an evaporative emissions test diagnostic procedure may be conducted based on the diurnal temperature cycle without adversely affecting the main battery supply in the vehicle. Furthermore, the evaporative emissions test diagnostic procedure may be conducted during either a transition from dark-to-sunlight hours (sunrise), or from sunlight-to-dark (sunset) hours. Enabling the evaporative emissions test diagnostic procedure to execute at either sunrise or sunset is an advantage over other prior art methods which make use of a vacuum switch to detect undesired evaporative emissions based on the diurnal temperature cycle. By enabling the evaporative emissions test diagnostic to execute at either sunrise or sunset events, both a pressure increase and a vacuum build may be utilized to infer the presence or absence of undesired evaporative emissions, in contrast to only relying on a vacuum build. As such, in use monitoring performance completion rates may be improved.

The technical effect of initiating an evaporative emissions test diagnostic procedure based on either sunrise or sunset events is to execute the evaporative emissions test diagnostic only at times where heat gains (e.g., sunrise) or heat losses (e.g., sunset) are greatest, thus increasing the potential for robust results from the diagnostic procedure. By sensing solar radiance and utilizing an edge detector to indicate sunrise and sunset events, a vehicle controller may be precisely awoken at opportune times of the diurnal cycle for conducting a test for undesired evaporative emissions, thus reducing battery drain as compared to other methods.

The systems described herein and with reference to FIG. 1, FIG. 3A-3C, and FIG. 4A-4B, along with the methods described herein and with reference to FIGS. 5-7, may enable one or more systems and one or more methods. In one example, a method comprises routing fuel vapors from a fuel tank in a fuel system to an evaporative emissions control system, the fuel system supplying fuel to an engine which propels a vehicle; conducting an evaporative emissions test diagnostic procedure of the fuel system and the evaporative emissions control system; and adjusting timing of the evaporative emissions test diagnostic procedure responsive to detection of an ambient light amount. In a first example of the method, the method further includes wherein the evaporative emissions test diagnostic procedure occurs during a vehicle-off condition. A second example of the method optionally includes the first example and further comprises maintaining a controller of the vehicle in a sleep mode during the vehicle-off condition; waking the controller based on the ambient light amount; and returning the controller to sleep mode responsive to completion of the evaporative emissions test diagnostic procedure. A third example of the method optionally includes any one or more or each of the first and second examples, and further includes wherein the ambient light amount is based on output from a solar cell configured on an external surface of the vehicle; and wherein the ambient light amount is related to an ambient temperature increase or an ambient temperature decrease during the course of a diurnal temperature cycle. A fourth example of the method optionally includes any one or more or each of the first through third examples and further includes wherein the ambient light amount includes a change in ambient light greater than a threshold; and wherein the change in ambient light greater than the threshold results in initiation of the evaporative emissions test diagnostic procedure. A fifth example of the method optionally includes any one or more or each of the first through fourth examples and further includes wherein the evaporative emissions test diagnostic procedure includes sealing the fuel system and the evaporative emissions control system of the vehicle from atmosphere; monitoring pressure in the fuel system and evaporative emissions control system; and indicating an presence of undesired evaporative emissions responsive to a change in pressure in the fuel system and evaporative emissions control system below a predetermined threshold change, or responsive to a rate of pressure change less than a predetermined threshold rate of pressure change. A sixth example of the method optionally includes any one or more or each of the first through fifth examples and further includes wherein the evaporative emissions control system includes a fuel vapor canister configured to capture and store fuel vapors from the fuel tank, and where the fuel system is fluidically coupled to the evaporative emissions control system; and wherein sealing the fuel system and evaporative emissions control system of the vehicle from atmosphere includes commanding closed a canister vent valve positioned in a vent line coupling the fuel vapor canister to atmosphere.

Another example of a method comprises routing fuel vapors from a fuel tank in a vehicle fuel system to an evaporative emissions control system which is coupled to atmosphere, the fuel tank supplying fuel to an engine which propels a vehicle; responsive to an indication of a vehicle-off event: in a first condition, maintaining a controller of the vehicle awake and conducting an engine off natural vacuum (EONV) test of the fuel system and the evaporative emissions control system; and in a second condition, sleeping the controller and searching for an indicated change in ambient light amount greater than a threshold; waking the sleeping controller when the indicated change in ambient light amount is greater than a threshold; and conducting an evaporative emissions test diagnostic procedure of the fuel system and the evaporative emissions control system in response to the waking of the controller. In a first example of the method, the method further comprises determining a heat rejection index, wherein the heat rejection index is based on an amount and/or timing of heat rejected by the engine for an engine run time duration prior to the vehicle-off event; wherein the first condition comprises the heat rejection index above a threshold; and wherein the second condition comprises the heat rejection index below the threshold. A second example of the method optionally includes the first example and further includes wherein the EONV test includes sealing the fuel system and evaporative emissions control system from atmosphere, monitoring a pressure increase in the fuel system and evaporative emissions control system, and indicating an absence of undesired evaporative emissions responsive to the pressure increase above a predetermined pressure-build threshold; and responsive to the pressure increase below the predetermined pressure-build threshold, unsealing the fuel system and evaporative emissions system to allow pressure in the fuel system and evaporative emissions control system to return to atmospheric pressure, resealing the fuel system and evaporative emissions control system; and indicating an absence of undesired evaporative emissions responsive to development of a vacuum-build greater than a predetermined vacuum-build threshold. A third example of the method optionally includes any one or more or each of the first and second examples and further includes wherein the evaporative emissions test diagnostic procedure includes sealing the fuel system and evaporative emissions control system from atmosphere; and indicating an absence of undesired evaporative emissions responsive to either a pressure build in the fuel system and evaporative emissions control system greater than a pressure-build threshold or a vacuum build in the fuel system and evaporative emissions control system greater than a vacuum-build threshold. A fourth example of the method optionally includes any one or more or each of the first through third examples and further includes wherein the controller is communicatively coupled to an off-board computing system via wireless communication and further comprising: retrieving weather data from the off-board computing system based on a location of the vehicle during either the EONV test or the evaporative emissions test diagnostic procedure; discarding results of either the EONV test or the evaporative emissions test diagnostic procedure based on an indication that weather conditions affected test results; and responsive to results from the EONV test being discarded: sleeping the controller and conducting the evaporative emissions test diagnostic procedure according to the second condition. A fifth example of the method optionally includes any one or more or each of the first through fourth examples and further includes wherein the indicated change in ambient light amount greater than a threshold includes either a sunrise event or a sunset event. A sixth example of the method optionally includes any one or more or each of the first through fifth examples and further includes wherein the indicated change in ambient light amount greater than a threshold is based on output from a solar cell configured on an external surface of the vehicle.

An example of a system for a vehicle comprises one or more solar cell(s) configured on an external surface of the vehicle; an operational amplifier comparator circuit configured to receive non-inverting input from the one or more solar cell(s), and configured to receive inverting input from a voltage source coupled to a first resistor and a second resistor in series; an edge detector circuit configured to receive a first output voltage from the operational amplifier comparator circuit; and a wake module of a vehicle controller configured to receive output from the edge detector circuit. In a first example, the system further includes wherein the edge detector circuit further comprises: an exclusive OR (XOR) logic gate. A second example of the system optionally includes the first example and further comprises a fuel tank configured within a fuel system; a fuel vapor canister, configured within an evaporative emissions control system, coupled to the fuel tank, further coupled to engine intake via a canister purge valve, and further coupled to atmosphere via a canister vent valve; a fuel tank pressure transducer; and wherein the controller stores instructions in non-transitory memory, that when executed, cause the controller to: responsive to an indication of a vehicle-off event; in a first condition, maintain the controller in an awake mode and conduct an engine-off natural vacuum (EONV) test by sealing the fuel system and evaporative emissions control system from atmosphere via commanding closed the canister vent valve, monitoring a pressure increase in the fuel system and evaporative emissions control system, and indicating an absence of undesired evaporative emissions responsive to the pressure increase above a predetermined pressure-build threshold; wherein responsive to the pressure increase below the predetermined pressure-build threshold, unsealing the fuel system and evaporative emissions system to allow pressure in the fuel system and evaporative emissions control system to return to atmospheric pressure, resealing the fuel system and evaporative emissions control system, and indicating an absence of undesired evaporative emissions responsive to development of a vacuum-build greater than a predetermined vacuum-build threshold; and in a second condition, sleep the controller. A third example of the system optionally includes any one or more or each of the first and second examples and further includes wherein the controller further stores instructions in non-transitory memory, that when executed, cause the controller to: responsive to the wake module of the vehicle controller receiving output from the edge detector circuit while the controller is asleep: conduct an evaporative emissions test diagnostic procedure by sealing the fuel system and evaporative emissions control system from atmosphere via commanding the canister vent valve closed; and indicate an absence of undesired evaporative emissions responsive to either a pressure build in the fuel system and evaporative emissions control system greater than a pressure-build threshold or a vacuum build in the fuel system and evaporative emissions control system greater than a vacuum-build threshold. A fourth example of the system optionally includes any one or more or each of the first through third examples and further includes wherein the controller further stores instructions in non-transitory memory, that when executed, cause the controller to: responsive to the indication of the vehicle-off event: determine a heat rejection index, wherein the heat rejection index is based on one or more of engine load over time, fuel injected summed over time, intake manifold air mass summed over time, or miles driven during a previous drive cycle; wherein the first condition comprises the heat rejection index above a threshold; wherein the second condition comprises the heat rejection index below the threshold; and wherein the threshold is further based on an ambient temperature and a level of fuel in the fuel tank. A fifth example of the system optionally includes any one or more or each of the first through fourth examples and further includes wherein either a sunrise or sunset event triggers the controller to an awake mode while the controller is in a sleep mode. Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:

routing fuel vapors from a fuel tank in a fuel system to an evaporative emissions control system, the fuel system supplying fuel to an engine which propels a vehicle;

conducting an evaporative emissions test diagnostic procedure of the fuel system and the evaporative emissions control system during a vehicle-off condition via sealing the fuel system and the evaporative emissions control system from atmosphere and monitoring pressure in the fuel system and the evaporative emissions control system; and adjusting timing of the evaporative emissions test diagnostic procedure and waking a controller to conduct the procedure responsive to detection of an ambient light amount based on output from a solar cell configured on an external surface of the vehicle.

2. The method of claim 1, further comprising:

maintaining the controller of the vehicle in a sleep mode during the vehicle-off condition prior to waking the controller to conduct the procedure, where waking the controller is based on the ambient light amount; and returning the controller to the sleep mode responsive to completion of the evaporative emissions test diagnostic procedure.

3. The method of claim 1, wherein the ambient light amount is related to an ambient temperature increase or an ambient temperature decrease during the course of a diurnal temperature cycle.

4. The method of claim 1, wherein the ambient light amount includes a change in ambient light greater than a threshold, and wherein the change in ambient light greater than the threshold results in initiation of the evaporative emissions test diagnostic procedure.

5. The method of claim 1, further comprising indicating a presence of undesired evaporative emissions responsive to a change in pressure in the fuel system and the evaporative emissions control system below a predetermined threshold change, or responsive to a rate of pressure change less than a predetermined threshold rate of pressure change.

6. The method of claim 5, wherein the evaporative emissions control system includes a fuel vapor canister configured to capture and store fuel vapors from the fuel tank, and where the fuel system is fluidically coupled to the evaporative emissions control system; and wherein sealing the fuel system and the evaporative emissions control system of the vehicle from atmosphere includes commanding closed a canister vent valve positioned in a vent line coupling the fuel vapor canister to atmosphere.

7. A method for a vehicle, comprising:

routing fuel vapors from a fuel tank in a vehicle fuel system to an evaporative emissions control system which is coupled to atmosphere, the fuel tank supplying fuel to an engine which propels a vehicle;

responsive to an indication of a vehicle-off event: in a first condition, maintaining a controller of the vehicle awake and conducting an engine off natural vacuum (EONV) test of the fuel system and the evaporative emissions control system; and, in a second condition, sleeping the controller and searching for an indicated change in ambient light amount greater than a threshold;

waking the sleeping controller when the indicated change in ambient light amount is greater than a threshold; and conducting an evaporative emissions test diagnostic procedure of the fuel system and the evaporative emissions control system in response to the waking of the controller.

8. The method of claim 7, further comprising:

determining a heat rejection index, wherein the heat rejection index is based on an amount and/or timing of heat rejected by the engine for an engine run time duration prior to the vehicle-off event;

wherein the first condition comprises the heat rejection index above a threshold; and wherein the second condition comprises the heat rejection index below the threshold.

9. The method of claim 7, wherein the EONV test includes sealing the fuel system and the evaporative emissions control system from atmosphere, monitoring a pressure increase in the fuel system and the evaporative emissions control system, and indicating an absence of undesired evaporative emissions responsive to the pressure increase above a predetermined pressure-build threshold;

responsive to the pressure increase below the predetermined pressure-build threshold, unsealing the fuel system and evaporative emissions system to allow pressure in the fuel system and evaporative emissions control system to return to atmospheric pressure, resealing the fuel system and evaporative emissions control system; and indicating the absence of undesired evaporative emissions responsive to development of a vacuum-build greater than a predetermined vacuum-build threshold.

10. The method of claim 7, wherein the evaporative emissions test diagnostic procedure includes sealing the fuel system and the evaporative emissions control system from atmosphere, and indicating an absence of undesired evaporative emissions responsive to either a pressure-build in the fuel system and the evaporative emissions control system greater than a pressure-build threshold or a vacuum-build in the fuel system and evaporative emissions control system greater than a vacuum-build threshold.

11. The method of claim 7, wherein the controller is communicatively coupled to an off-board computing system via wireless communication and further comprising:

retrieving weather data from the off-board computing system based on a location of the vehicle during either the EONV test or the evaporative emissions test diagnostic procedure;

discarding results of either the EONV test or the evaporative emissions test diagnostic procedure based on an indication that weather conditions affected test results; and responsive to results from the EONV test being discarded:

sleeping the controller and conducting the evaporative emissions test diagnostic procedure according to the second condition.

12. The method of claim 7, wherein the indicated change in ambient light amount greater than the threshold includes either a sunrise event or a sunset event.

13. The method of claim 7, wherein the indicated change in ambient light amount greater than the threshold is based on output from a solar cell configured on an external surface of the vehicle.

14. A system for a vehicle, comprising:

one or more solar cell(s) configured on an external surface of the vehicle;

an operational amplifier comparator circuit configured to receive non-inverting input from the one or more solar cell(s), and configured to receive inverting input from a voltage source coupled to a first resistor and a second resistor in series;

an edge detector circuit configured to receive a first output voltage from the operational amplifier comparator circuit;

a wake module of a controller of the vehicle configured to receive output from the edge detector circuits;

a fuel tank configured within a fuel system;

a fuel vapor canister, configured within an evaporative emissions control system, coupled to the fuel tank, further coupled to an engine intake via a canister purge valve, and further coupled to atmosphere via a canister vent valve; and a fuel tank pressure transducer;

wherein the controller stores computer readable instructions in non-transitory memory that, when executed, cause the controller to:

at a vehicle-off event and based on a heat rejection index for an engine run time duration prior to the vehicle-off event, in a first condition, maintain the controller in an awake mode and conduct an engine-off natural vacuum (EONV) test by sealing the fuel system and the evaporative emissions control system from atmosphere via commanding closed the canister vent valve and the canister purge valve, and monitoring pressure in the fuel system and the evaporative emissions control system via the fuel tank pressure transducer; and in a second condition, sleep the controller and, responsive to the wake module of the controller receiving output from the edge detector circuit while the controller is asleep, wake the controller and conduct an evaporative emissions test diagnostic procedure by sealing the fuel system and the evaporative emissions control system from atmosphere via commanding the canister vent valve and the canister purge valve closed and monitoring the pressure in the fuel system and the evaporative emissions control system via the fuel tank pressure transducer.

15. The system of claim 14, wherein the edge detector circuit further comprises:

an exclusive OR (XOR) logic gate.

16. The system of claim 14, wherein, in the first condition, monitoring pressure includes monitoring a pressure increase in the fuel system and the evaporative emissions control system, and indicating an absence of undesired evaporative emissions responsive to the pressure increase above a predetermined pressure-build threshold; and wherein, responsive to the pressure increase below the predetermined pressure-build threshold, the controller stores further instructions to unseal the fuel system and the evaporative emissions control system to allow pressure in the fuel system and the evaporative emissions control system to return to atmospheric pressure, reseal the fuel system and the evaporative emissions control system, and indicate the absence of undesired evaporative emissions responsive to development of a vacuum-build greater than a predetermined vacuum-build threshold.

17. The system of claim 14, wherein the controller further stores instructions in non-transitory memory that when executed, cause the controller to, in the second condition:

indicate the absence of undesired evaporative emissions responsive to either a pressure-build in the fuel system and the evaporative emissions control system greater than a pressure-build threshold or a vacuum-build in the fuel system and the evaporative emissions control system greater than a vacuum-build threshold.

18. The system of claim 14, wherein the controller further stores instructions in non-transitory memory that when executed, cause the controller to determine the heat rejection index, based on one or more of engine load over time, fuel injected summed over time, intake manifold air mass summed over time, or miles driven during a previous drive cycle;

wherein the first condition comprises the heat rejection index above a threshold;

wherein the second condition comprises the heat rejection index below the threshold; and wherein the threshold is further based on an ambient temperature and a level of fuel in the fuel tank.

19. The system of claim 14, wherein either a sunrise or sunset event triggers the controller to the awake mode while the controller is asleep.

* * * * *